US011425670B2

(12) United States Patent
Ma et al.

(10) Patent No.: US 11,425,670 B2
(45) Date of Patent: Aug. 23, 2022

(54) SYNCHRONIZATION SIGNAL BLOCK MONITORING OCCASION DESIGN FOR NON-TERRESTRIAL COMMUNICATIONS

(71) Applicant: QUALCOMM Incorporated, San Diego, CA (US)

(72) Inventors: Liangping Ma, San Diego, CA (US); Huilin Xu, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/248,062

(22) Filed: Jan. 7, 2021

(65) Prior Publication Data

US 2022/0217658 A1 Jul. 7, 2022

(51) Int. Cl.
*H04W 56/00* (2009.01)
*H04W 68/02* (2009.01)
*H04W 76/28* (2018.01)
*H04W 72/04* (2009.01)

(52) U.S. Cl.
CPC ......... *H04W 56/001* (2013.01); *H04W 68/02* (2013.01); *H04W 72/042* (2013.01); *H04W 76/28* (2018.02)

(58) Field of Classification Search
CPC . H04W 56/001; H04W 68/02; H04W 72/042; H04W 76/28
See application file for complete search history.

(56) References Cited

U.S. PATENT DOCUMENTS

| 2020/0092846 | A1* | 3/2020 | Deng | H04W 68/025 |
| 2020/0137599 | A1 | 4/2020 | Yiu | |
| 2020/0137666 | A1* | 4/2020 | Agiwal | H04W 48/12 |
| 2020/0322918 | A1* | 10/2020 | Shih | H04W 24/08 |

OTHER PUBLICATIONS

Interdigital Inc: "Remaining Details on Paging", 3GPP Draft, 3GPP TSG RAN WG1 Meeting #92, R1-1802615, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 26, 2018-Feb. 3, 2018, Feb. 17, 2018 (Feb. 17, 2018), XP051398054, 5 Pages, Retrieved from the Internet: URL: http://www.3gpp.org/ftp/tsg%5Fran/WG1%5FRL1/TSGR1%5F92/Docs/ [Retrieved on Feb. 17, 2018] Paragraph [0004].
International Search Report and Written Opinion—PCT/US2021/072963 - ISA/EPO—dated Jun. 3, 2022.
Partial International Search REPORT—PCT/US2021/072963—ISA/EPO—dated Apr. 13, 2022.

* cited by examiner

*Primary Examiner* — Kyaw Z Soe
(74) *Attorney, Agent, or Firm* — Harrity & Harrity, LLP

(57) ABSTRACT

Various aspects of the present disclosure generally relate to wireless communication. In some aspects, a user equipment (UE) may receive, from a non-terrestrial network (NTN) entity, a configuration message that indicates first paging monitoring occasions (MOs) for first consecutive synchronization signal blocks (SSBs) to be transmitted in a first set of beams and second paging MOs for second consecutive SSBs to be transmitted in a second set of beams. The UE may monitor for the first consecutive SSBs during the first paging MOs and for the second consecutive SSBs during the second paging MOs such that the first paging MOs overlap in time with the second paging MOs. Numerous other aspects are provided.

22 Claims, 16 Drawing Sheets

SYNCHRONIZATION SIGNAL BLOCK MONITORING OCCASION DESIGN FOR NON-TERRESTRIAL COMMUNICATIONS

FIELD OF THE DISCLOSURE

Aspects of the present disclosure generally relate to wireless communication and to techniques and apparatuses for monitoring for synchronization signal blocks during paging monitoring occasions for non-terrestrial communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a non-terrestrial network (NTN) entity, a configuration message that indicates first paging monitoring occasions (MOs) for first consecutive synchronization signal blocks (SSBs) to be transmitted in a first set of beams and second paging MOs for second consecutive SSBs to be transmitted in a second set of beams. The method includes monitoring for the first consecutive SSBs during the first paging MOs and for the second consecutive SSBs during the second paging MOs, where the first paging MOs overlap in time with the second paging MOs.

In some aspects, a method of wireless communication performed by an NTN entity includes transmitting, to a UE, a configuration message that indicates first paging MOs for first consecutive SSBs to be transmitted in a first set of beams and second paging MOs for second consecutive SSBs to be transmitted in a second set of beams. The method includes transmitting the first SSBs during the first paging MOs and the second SSBs during the second paging MOs such that the first paging MOs overlap in time with the second paging MOs.

In some aspects, a method of wireless communication performed by a UE includes receiving, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam. The method includes monitoring for the first SSB in the first quantity of repetitions of the first paging MO and for the second SSB in the second quantity of repetitions of the second paging MO, where the second quantity of consecutive repetitions follows the first quantity of consecutive repetitions.

In some aspects, a method of wireless communication performed by an NTN entity includes transmitting, to a UE, a configuration message that indicates a first quantity of consecutive repetitions of a first paging MO for a first SSB transmitted in a first beam and a second quantity of consecutive repetitions of a second paging MO for a second SSB transmitted in a second beam. The method includes transmitting the first SSB in the first quantity of repetitions of the first paging MO and the second SSB in the second quantity of repetitions of the second paging MO, where the second quantity of consecutive repetitions follows the first quantity of consecutive repetitions.

In some aspects, a UE for wireless communication includes a memory and one or more processors operatively coupled to the memory, the memory and the one or more processors configured to receive, from an NTN entity, a configuration message that indicates first paging MOs for first consecutive SSBs to be transmitted in a first set of beams and second paging MOs for second consecutive SSBs to be transmitted in a second set of beams. The one or more processors are configured to monitor for the first consecutive SSBs during the first paging MOs and for the second consecutive SSBs during the second paging MOs, where the first paging MOs overlap in time with the second paging MOs.

In some aspects, an NTN entity for wireless communication includes a memory and one or more processors operatively coupled to the memory, the memory and the one or more processors configured to transmit, to a UE, a configuration message that indicates first paging MOs for first consecutive SSBs to be transmitted in a first set of beams and second paging MOs for second consecutive SSBs to be transmitted in a second set of beams. The one or more processors are configured to transmit the first SSBs during the first paging MOs and the second SSBs during the second paging MOs such that the first paging MOs overlap in time with the second paging MOs.

In some aspects, a UE for wireless communication includes a memory and one or more processors operatively coupled to the memory, the memory and the one or more processors configured to receive, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam. The one or more processors are configured to monitor for the first SSB in the first quantity of repetitions of the first paging MO and for the second SSB in the second quantity of repetitions of the second paging MO, where the second quantity of consecutive repetitions follows the first quantity of consecutive repetitions.

In some aspects, an NTN entity for wireless communication includes a memory and one or more processors operatively coupled to the memory, the memory and the one or more processors configured to transmit, to a UE, a configuration message that indicates a first quantity of consecutive repetitions of a first paging MO for a first SSB transmitted in a first beam and a second quantity of consecutive repetitions of a second paging MO for a second SSB transmitted in a second beam. The one or more processors are configured to transmit the first SSB in the first quantity of repetitions of the first paging MO and the second SSB in the second quantity of repetitions of the second paging MO, where the second quantity of consecutive repetitions follows the first quantity of consecutive repetitions.

In some aspects, a non-transitory computer-readable medium storing a set of instructions for wireless communication includes one or more instructions that, when executed by one or more processors of a UE, cause the UE to receive, from an NTN entity, a configuration message that indicates first paging MOs for first consecutive SSBs to be transmitted in a first set of beams and second paging MOs for second consecutive SSBs to be transmitted in a second set of beams, and monitor for the first consecutive SSBs during the first paging MOs and for the second consecutive SSBs during the second paging MOs, where the first paging MOs overlap in time with the second paging MOs.

In some aspects, a non-transitory computer-readable medium storing a set of instructions for wireless communication includes one or more instructions that, when executed by one or more processors of an NTN entity, cause the NTN entity to transmit, to a UE, a configuration message that indicates first paging MOs for first consecutive SSBs to be transmitted in a first set of beams and second paging MOs for second consecutive SSBs to be transmitted in a second set of beams, and transmit the first SSBs during the first paging MOs and the second SSBs during the second paging MOs such that the first paging MOs overlap in time with the second paging MOs.

In some aspects, a non-transitory computer-readable medium storing a set of instructions for wireless communication includes one or more instructions that, when executed by one or more processors of an UE, cause the UE to receive, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam, and monitor for the first SSB in the first quantity of repetitions of the first paging MO and for the second SSB in the second quantity of repetitions of the second paging MO, where the second quantity of consecutive repetitions follows the first quantity of consecutive repetitions.

In some aspects, a non-transitory computer-readable medium storing a set of instructions for wireless communication includes one or more instructions that, when executed by one or more processors of an NTN entity, cause the NTN entity to transmit, to a UE, a configuration message that indicates a first quantity of consecutive repetitions of a first paging MO for a first SSB transmitted in a first beam and a second quantity of consecutive repetitions of a second paging MO for a second SSB transmitted in a second beam, and transmit the first SSB in the first quantity of repetitions of the first paging MO and the second SSB in the second quantity of repetitions of the second paging MO, where the second quantity of consecutive repetitions follows the first quantity of consecutive repetitions.

In some aspects, an apparatus for wireless communication includes means for receiving, from an NTN entity, a configuration message that indicates first paging MOs for first consecutive SSBs to be transmitted in a first set of beams and second paging MOs for second consecutive SSBs to be transmitted in a second set of beams, and means for monitoring for the first consecutive SSBs during the first paging MOs and for the second consecutive SSBs during the second paging MOs, where the first paging MOs overlap in time with the second paging MOs.

In some aspects, an apparatus for wireless communication includes means for transmitting, to a UE, a configuration message that indicates first paging MOs for first consecutive SSBs to be transmitted in a first set of beams and second paging MOs for second consecutive SSBs to be transmitted in a second set of beams, and means for transmitting the first SSBs during the first paging MOs and the second SSBs during the second paging MOs such that the first paging MOs overlap in time with the second paging MOs.

In some aspects, an apparatus for wireless communication includes means for receiving, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam, and means for monitoring for the first SSB in the first quantity of repetitions of the first paging MO and for the second SSB in the second quantity of repetitions of the second paging MO, where the second quantity of consecutive repetitions follows the first quantity of consecutive repetitions.

In some aspects, an apparatus for wireless communication includes means for transmitting, to a UE, a configuration message that indicates a first quantity of consecutive repetitions of a first paging MO for a first SSB transmitted in a first beam and a second quantity of consecutive repetitions of a second paging MO for a second SSB transmitted in a second beam, and means for transmitting the first SSB in the first quantity of repetitions of the first paging MO and the second SSB in the second quantity of repetitions of the second paging MO, where the second quantity of consecutive repetitions follows the first quantity of consecutive repetitions.

Aspects generally include a method, apparatus, system, computer program product, non-transitory computer-readable medium, user equipment, base station, NTN entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
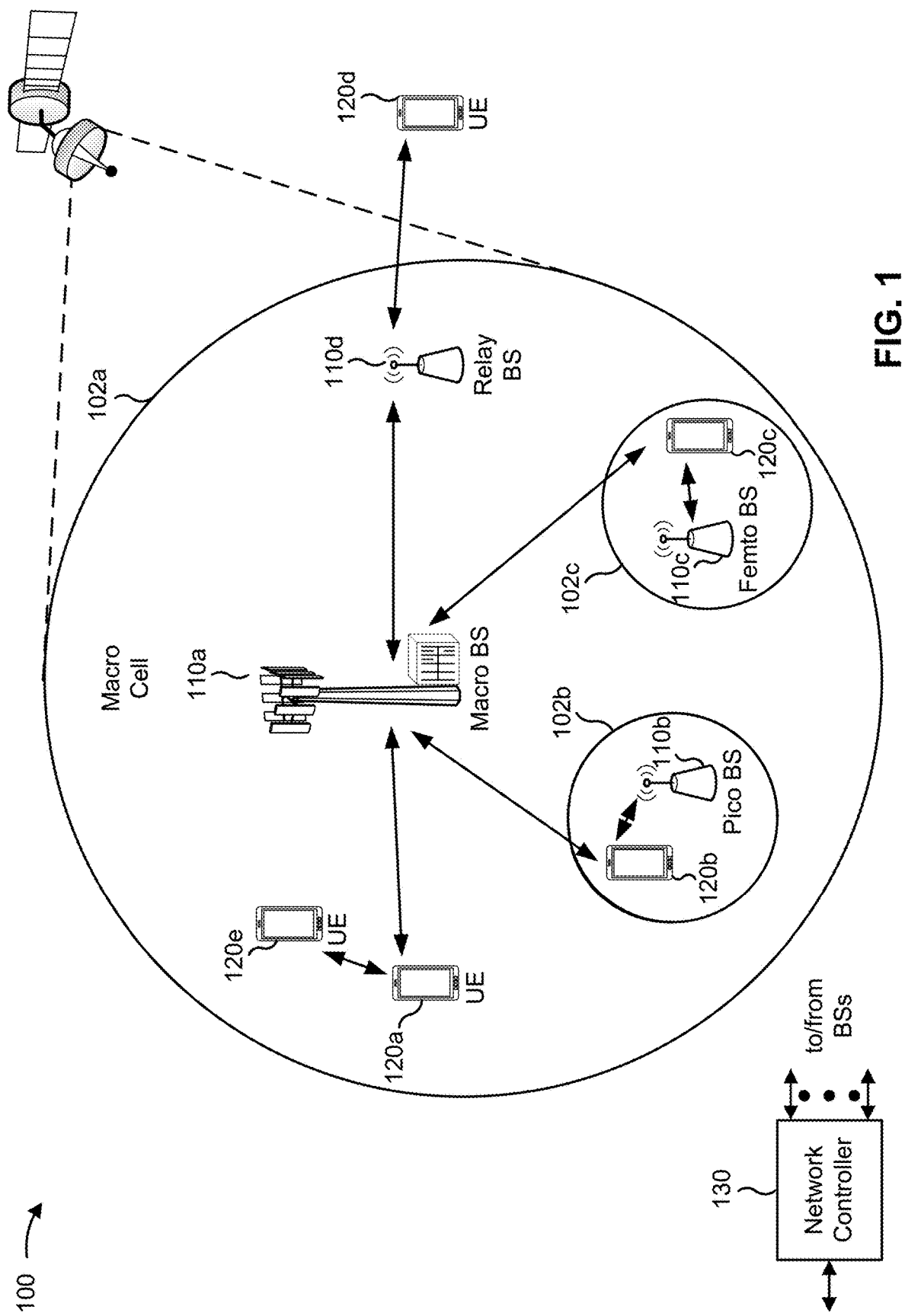
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

In some aspects, as shown, a cell may be provided by a base station 110 of a non-terrestrial network. As used herein, "non-terrestrial network" (NTN) may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like. In some aspects, a relay station may be implemented using a non-terrestrial platform, similarly to the base station described above.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
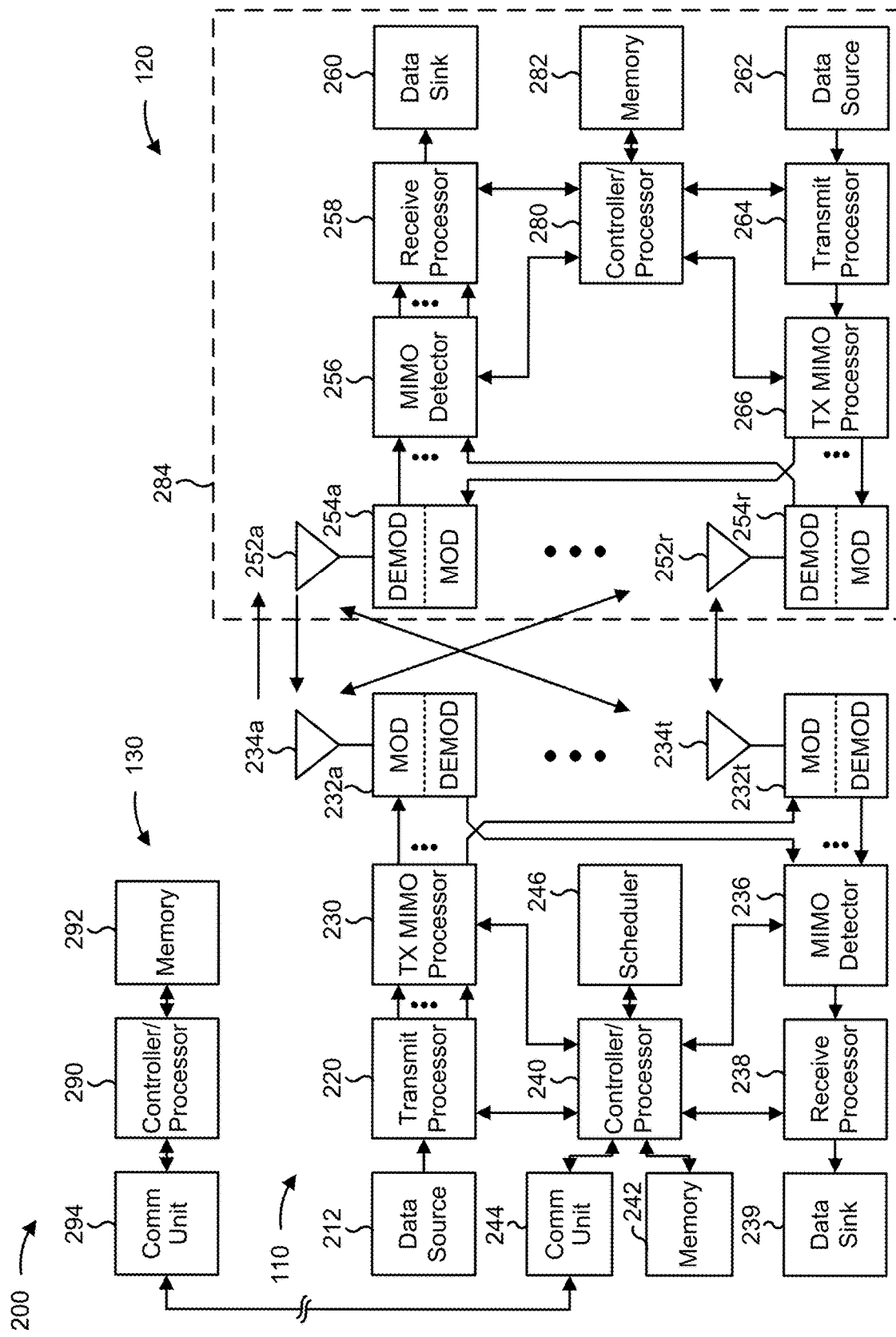
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-14.

Controller/processor 240 of base station 110, controller/processor 280 of UE 120, and/or any other component(s) of FIG. 2 may perform one or more techniques associated with monitoring synchronization signal blocks (SSBs) during paging monitoring occasions (MOs) for communications from a non-terrestrial network (NTN) entity, as described in more detail elsewhere herein. For example, a controller/processor of an NTN entity (e.g., controller/processor 240 of base station 110), controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. A memory may store data and program codes for the NTN entity, and memories 242 and 282 may store data and program codes for base station 110 and UE 120, respectively. In some aspects, the memory for the NTN entity, memory 242, and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the NTN entity, the base station 110, and/or the UE 120, may cause the one or more processors, the NTN entity, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, interpreting the instructions, and/or the like.

In some aspects, UE 120 includes means for receiving, from an NTN entity, a configuration message that indicates first paging MOs for first consecutive SSBs to be transmitted in a first set of beams and second paging MOs for second consecutive SSBs to be transmitted in a second set of beams, and/or means for monitoring for the first consecutive SSBs during the first paging MOs and for the second consecutive SSBs during the second paging MOs such that the first paging MOs overlap in time with the second paging MOs. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the NTN entity includes means for transmitting, to a UE, a configuration message that indicates first paging MOs for first consecutive SSBs to be transmitted in a first set of beams and second paging MOs for second consecutive SSBs to be transmitted in a second set of beams, and/or means for transmitting the first SSBs during the first paging MOs and the second SSBs during the second paging MOs such that the first paging MOs overlap in time with the second paging MOs. In some aspects, the means for the NTN entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, UE 120 includes means for receiving, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam, and/or means for monitoring for the first SSB in the first quantity of repetitions of the first paging MO and for the second SSB in the second quantity of repetitions of the second paging MO, where the second quantity of consecutive repetitions follows the first quantity of consecutive repetitions. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the NTN entity includes means for transmitting, to a UE, a configuration message that indicates a first quantity of consecutive repetitions of a first paging MO for a first SSB transmitted in a first beam and a second quantity of consecutive repetitions of a second paging MO for a second SSB transmitted in a second beam, and/or means for transmitting the first SSB in the first quantity of repetitions of the first paging MO and the second SSB in the second quantity of repetitions of the second paging MO, where the second quantity of consecutive repetitions follows the first quantity of consecutive repetitions. In some aspects, the means for the NTN entity to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
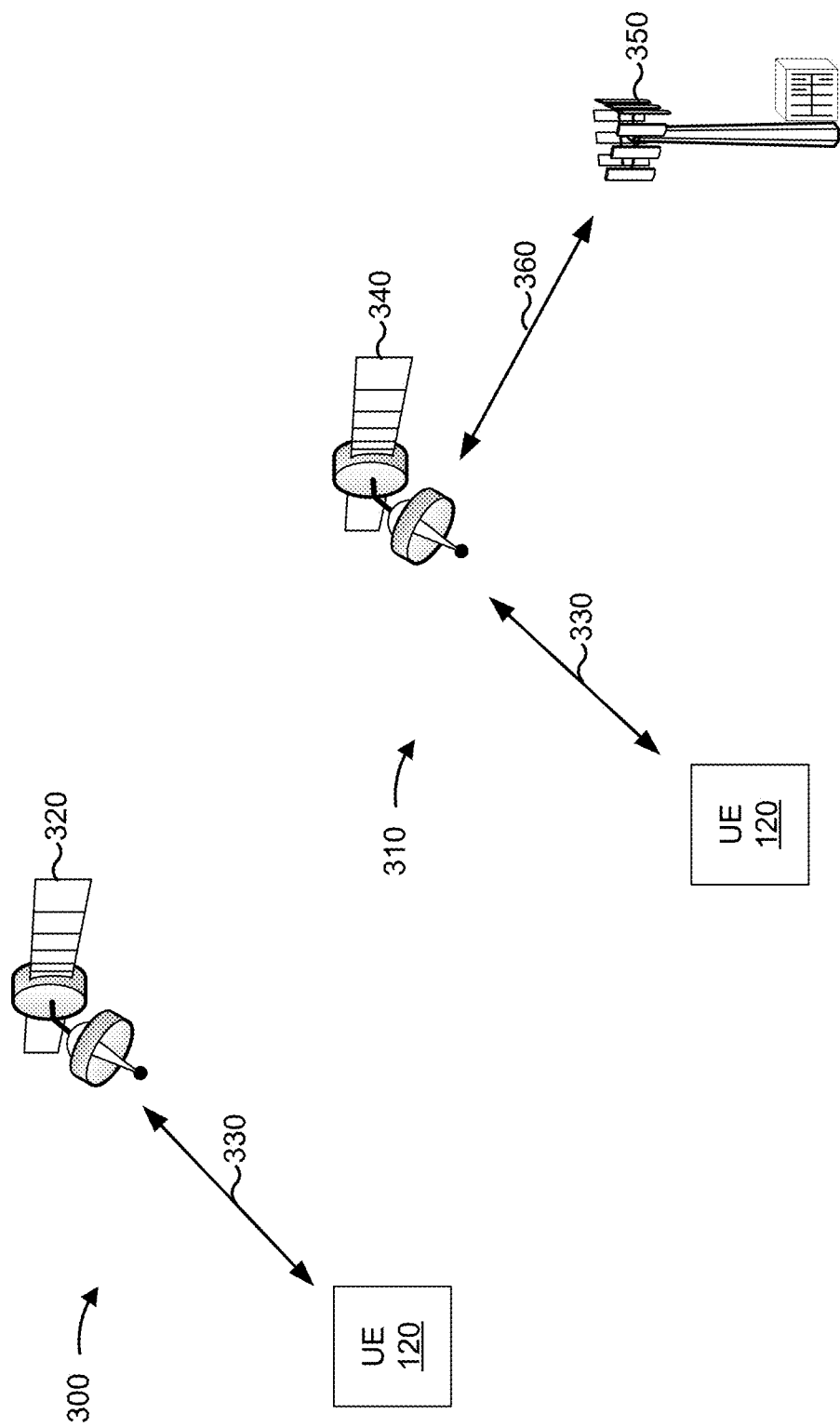
FIG. 3 is a diagram illustrating an example of a regenerative satellite deployment and an example of a transparent satellite deployment in a non-terrestrial network (NTN).

FIG. 3 is a diagram illustrating an example 300 of a regenerative satellite deployment and an example 310 of a transparent satellite deployment in an NTN.

Example 300 shows a regenerative satellite deployment. In example 300, a UE 120 is served by a satellite 320 via a service link 330. For example, the satellite 320 may include a BS 110 (e.g., BS 110a), a gNB, and/or the like. In some aspects, the satellite 320 may be referred to as a non-terrestrial base station, a regenerative repeater, an on-board processing repeater, an NTN entity, and/or the like. In some aspects, the satellite 320 may demodulate an uplink radio frequency signal and may modulate a baseband signal derived from the uplink radio signal to produce a downlink radio frequency transmission. The satellite 320 may transmit the downlink radio frequency signal on the service link 330. The satellite 320 may provide a cell that covers the UE 120.

Example 310 shows a transparent satellite deployment, which may also be referred to as a bent-pipe satellite deployment. In example 310, a UE 120 is served by a satellite 340 via the service link 330. Satellite 340 may also be considered to be an NTN entity. The satellite 340 may be a transparent satellite. The satellite 340 may relay a signal received from gateway 350 via a feeder link 360. For example, the satellite may receive an uplink radio frequency transmission and may transmit a downlink radio frequency transmission without demodulating the uplink radio frequency transmission. In some aspects, the satellite may frequency convert the uplink radio frequency transmission received on the service link 330 to a frequency of the uplink radio frequency transmission on the feeder link 360 and may amplify and/or filter the uplink radio frequency transmission. In some aspects, the UEs 120 shown in example 300 and example 310 may be associated with a Global Navigation Satellite System (GNSS) capability, a Global Positioning System (GPS) capability, and/or the like, though not all UEs have such capabilities. The satellite 340 may provide a cell that covers the UE 120.

The service link 330 may include a link between the satellite 340 and the UE 120, and may include one or more of an uplink or a downlink. The feeder link 360 may include a link between the satellite 340 and the gateway 350, and may include one or more of an uplink (e.g., from the UE 120 to the gateway 350) or a downlink (e.g., from the gateway 350 to the UE 120).

The feeder link 360 and the service link 330 may each experience Doppler effects due to the movement of the satellites 320 and 340, and potentially movement of a UE 120. These Doppler effects may be significantly larger than in a terrestrial network. The Doppler effect on the feeder link 360 may be compensated for to some degree, but may still be associated with some amount of uncompensated frequency error. Furthermore, the gateway 350 may be associated with a residual frequency error, and/or the satellite 320/340 may be associated with an on-board frequency error. These sources of frequency error may cause a received downlink frequency at the UE 120 to drift from a target downlink frequency.

As indicated above, FIG. 3 is provided as an example. Other examples may differ from what is described with regard to FIG. 3.

A UE served by an NTN may use discontinuous reception (DRX) to save power. DRX involves cycles of the UE sleeping and waking, and the UE saves power when sleeping. The deeper the sleep, the more power the UE may save. For example, a deep sleep may consume about 20 times less power than a light sleep and about 50 times less power than a micro sleep. The UE may have some level of activity during the light sleep and even more activity during the micro sleep. The deeper the sleep, the more time and energy it takes for the UE to wake up. For example, the UE may consume almost 100 times more energy and 6 ms more time to wake up from a light sleep than to wake up from a micro sleep. The UE may consume almost 450 times more energy and 20 ms more time to wake from a deep sleep than to wake up from a micro sleep.

The UE may wake up periodically in a paging occasion to receive a paging message in a physical downlink control channel (PDCCH) or a physical downlink shared channel (PDSCH). The paging occasion may include multiple paging MOs, where each paging MO may be an opportunity to monitor for a single paging message. The paging message may include an SSB, temporary identifiers, and/or other information for establishing future communications. The paging message may be scheduled by downlink control information (DCI). The time and power consumed by the UE when waking up in each cycle for paging MOs depends on how deep the UE has been sleeping.

Figure 4:
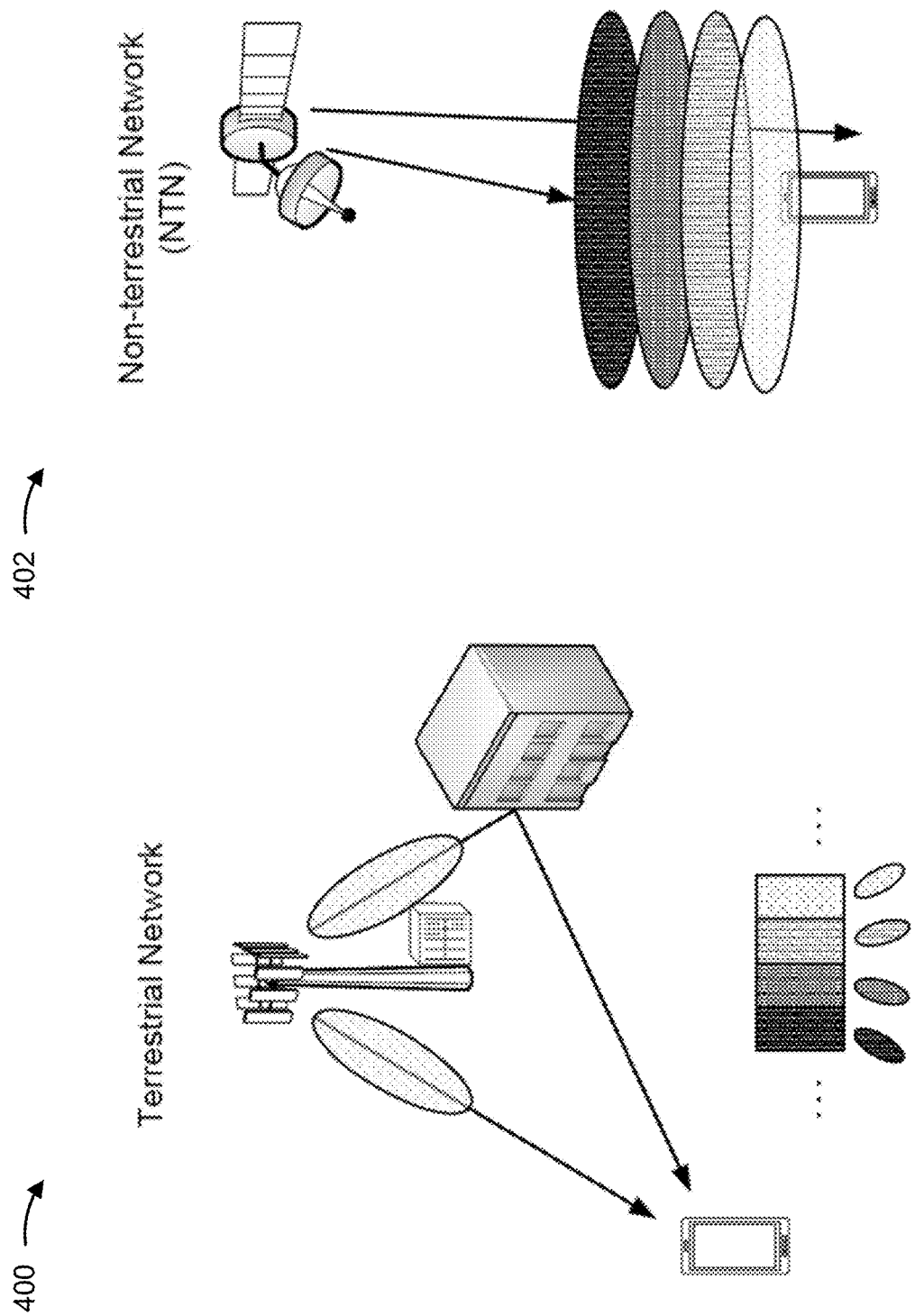
FIG. 4 is a diagram illustrating examples of transmitting synchronization signal blocks (SSBs) in multiple beams, in accordance with various aspects of the present disclosure.

FIG. 4 is a diagram illustrating examples 400 and 402 of transmitting SSBs in multiple beams, in accordance with various aspects of the present disclosure.

A network may transmit SSBs to UEs. An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network may transmit multiple SSBs on multiple corresponding beams, and the SSBs may be used for beam selection.

A network may transmit SSBs using beam sweeping, where the network transmits multiple beams in different directions. The network may transmit SSBs on all beams of a beam sweep, because the network may not know whether a UE within coverage of an SSB beam is actively monitoring for an SSB.

Example 400 shows a base station of a terrestrial network that transmits SSBs in multiple beams of a beam sweep. The SSBs may be consecutive SSBs transmitted in consecutive paging MOs, or MOs that are contiguous and/or in order. Due to beam reflection off of buildings or other objects, a UE may simultaneously receive signals from multiple SSB beams, even though these beams are not adjacent to each other (consecutive in time) at the base station. A benefit of transmitting SSBs in consecutive MOs is that a UE may potentially combine SSBs from multiple beams. If a same SSB is received both directly and in a reflection, the SSB may be received with a greater gain. If the SSB is successfully received during a wake cycle, the UE may conserve power by not having to remain awake or wake again from sleep to receive the SSB.

Example 402 shows an NTN entity, such as a satellite of an NTN, that transmits SSBs in multiple beams. Because of the vertical direction of signals from the satellite and the rare propagation of signals reflected off the earth's surface, a UE may not receive two beams of SSBs unless the UE is at an intersection of two beam coverage areas. The UE may have to remain awake to receive any other SSBs. That is, in most cases involving an NTN, a UE may be unable to simultaneously receive and/or combine multiple SSBs from the satellite. If the SSB is not successfully received, the UE may have to remain awake or wake again to receive the SSB. The more the UE remains awake or wakes to receive an SSB, the greater amount of power and processing resources that the UE consumes.

According to various aspects described herein, an NTN entity may transmit a configuration message to a UE indicating that the NTN entity is to transmit multiple SSBs (e.g., two SSBs) in a same paging MO, or that a paging MO of a first SSB is to overlap in time with a paging MO of a second SSB. This may involve multiple simultaneous beams for the SSBs. In this way, the UE may wake up once to monitor for multiple SSBs, or monitor for multiple SSBs for a shorter duration. As a result, the UE may conserve time, power, and processing resources while attempting to receive SSBs. In some aspects, each SSB of a paging occasion may be repeated in multiple consecutive paging MOs. An aggregation of consecutive SSB repetitions may increase the chance of a wake UE receiving the SSB.

As indicated above, FIG. 4 provides examples. Other examples may differ from what is described with regard to FIG. 4.

Figure 5:
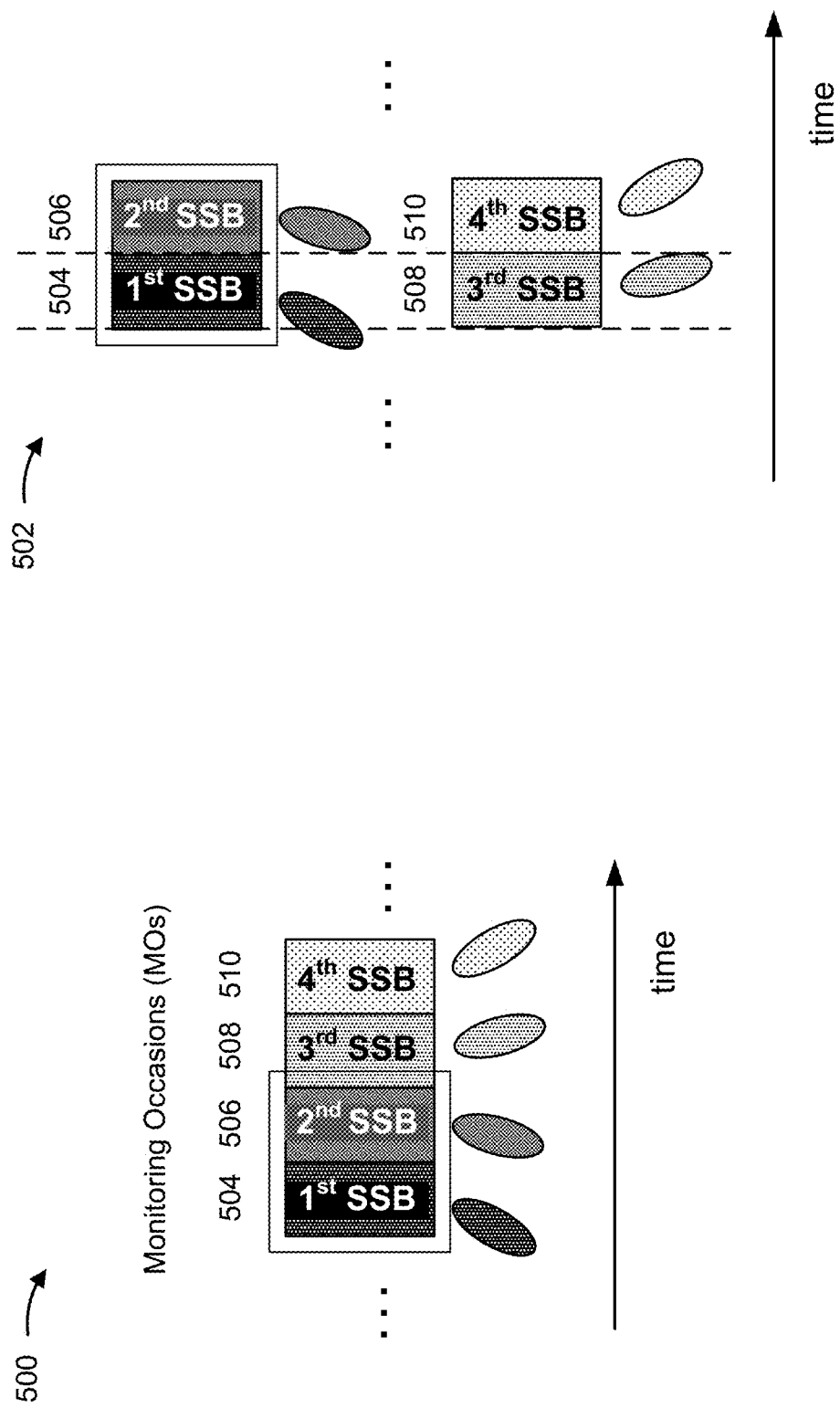
FIG. 5 is a diagram illustrating examples of paging monitoring occasions (MOs), in accordance with various aspects of the present disclosure.

FIG. 5 is a diagram illustrating examples 500 and 502 of paging MOs, in accordance with various aspects of the present disclosure.

Example 500 shows paging MO 504 for a first SSB (SSB 1), paging MO 506 for a second SSB (SSB 2), paging MO 508 for a third SSB (SSB 3), and paging MO 510 for a fourth SSB (SSB 4). A UE may have to remain awake long enough to monitor the four consecutive paging MOs 504 through 510, in order to receive one or more SSBs.

Example 502 shows how an NTN entity may transmit the first SSB and the third SSB such that their paging MOs 504 and 508 overlap in time. The UE may monitor for the first SSB and the third SSB and receive, in a single paging MO, the first SSB and/or the third SSB. The NTN entity may then transmit the second SSB and the fourth SSB such that their paging MOs 506 and 510 also overlap. The UE may monitor for the second SSB and the fourth SSB and receive, in a single paging MO, the second SSB and/or the fourth SSB. In this way, the UE may be awake for a shorter period of time than in example 500 and may receive any of the four SSBs.

In some aspects, paging MOs are not to overlap for adjacent SSBs. For example, paging MO 504 may not overlap with paging MO 506, because the first SSB is adjacent, or consecutive in time, with the second SSB. Likewise, paging MO 506 may not overlap with paging MO 508, and paging MO 508 may not overlap with paging MO 510. Paging MO 504 and paging MO 506 may be considered a first set of paging MOs, and paging MO 508 and paging MO 510 may be considered a second set of paging MOs. The first set of paging MOs may overlap in time with the second set of paging MOs because each set of paging MOs has multiple paging MOs such that paging MOs with adjacent SSBs do not overlap.

As indicated above, FIG. 5 provides examples. Other examples may differ from what is described with regard to FIG. 5.

Figure 6:
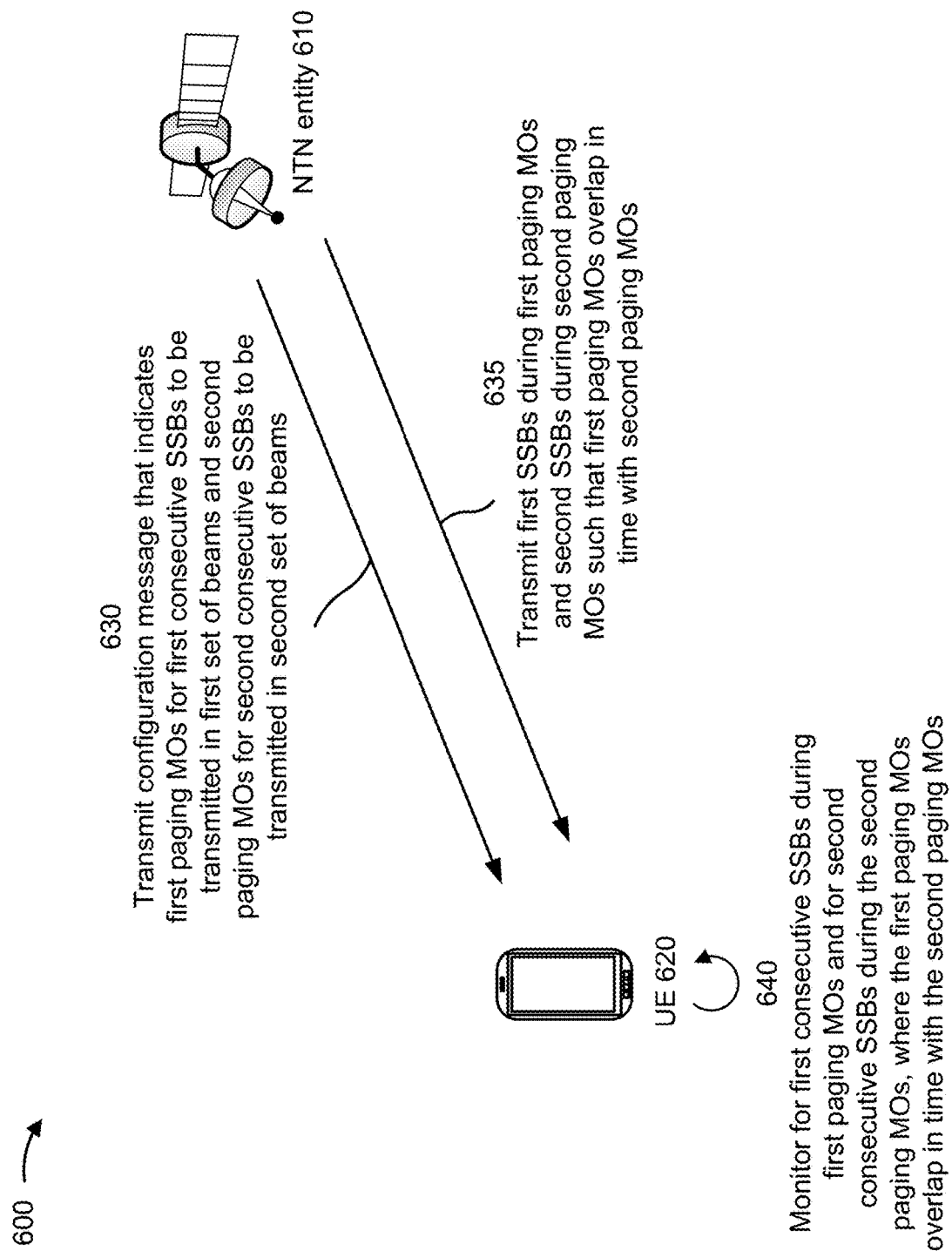
FIG. 6 is a diagram illustrating an example of monitoring for SSBs during paging MOs for non-terrestrial communications, in accordance with various aspects of the present disclosure.

FIG. 6 is a diagram illustrating an example 600 of monitoring for SSBs during paging MOs for non-terrestrial communications, in accordance with various aspects of the present disclosure. As shown, FIG. 6 includes an NTN entity 610 (e.g., base station, relay station) and a UE 620 that may communicate with each other over a satellite link. In some aspects, UE 620 may include a ground station.

As shown by reference number 630, NTN entity 610 may transmit a configuration message that indicates first paging MOs for first consecutive SSBs to be transmitted in a first set of beams. The configuration message also indicates second paging MOs for second consecutive SSBs to be transmitted in a second set of beams. SSBs may be consecutive in time, such as SSB 1 immediately followed by SSB 2, which is immediately followed by SSB 3. NTN entity 610 may generate the configuration message that allocates paging MOs to the first paging MOs and the second paging MOs based at least in part on a quantity of SSBs, a capability of the UE, a power status of the UE, a location of the UE, and/or a reported quantity of SSBs for a set of paging MOs. The configuration message may indicate that the first paging MOs may overlap in time with the second paging MOs.

As shown by reference number 635, NTN entity 610 may transmit the first SSBs during the first paging MOs and transmit the second SSBs during the second paging MOs. The first paging MOs may overlap with the second paging MOs. More particularly, a starting paging MO for the first paging MOs may overlap in time with a starting paging MO for the second paging MO, as shown by example 502 in FIG. 5. A next paging MO for the first paging MOs may overlap in time with a next paging MO for the second paging MOs. Accordingly, UE 620 may be able to monitor for and receive multiple SSBs per paging MO.

As shown by reference number 640, UE 620 may monitor for the first consecutive SSBs during the first paging MOs and for the second consecutive SSBs during the second paging MOs. Because the first paging MOs overlap with the second paging MOs, UE 620 may receive one of two SSBs per paging MO. For example, UE 620 may monitor for SSB 1 and SSB 3 in a single paging MO and decode SSB 1 and/or SSB 3. UE 620 may establish future communications based at least in part on SSB 1 or SSB 3. UE 620 may, based on receiving the configuration message, wake up once (rather than twice) or remain awake for half the time in order to receive SSB 1 and/or SSB 3. This enables UE 620 to conserve power and processing resources. An amount of time that UE 620 does not sleep may be based at least in part on a size of the first paging MOs and the second paging MOs, or a quantity of sets of paging MOs. In some aspects, UE 620 may switch between sets of paging MOs.

In some aspects, NTN entity 610 may indicate paging MO numbers for SSBs and/or a starting paging MO number (e.g., firstPDCCH-MonitoringOccasionOfSSB) for each SSB. NTN entity 610 may use the paging MO numbers of SSBs to configure the first paging MOs (starting with the indicated starting paging MO) and the second paging MOs. In some aspects, NTN entity 610 may configure other parameters to define a pattern of overlapping SSBs. For example, NTN entity 610 may indicate a quantity N of consecutive non-overlapping SSBs. The first paging MOs may be for the first N consecutive SSBs, and the second paging MOs may be for the next N consecutive SSBs that follow the first N consecutive SSBs.

In some aspects, NTN entity 610 may indicate and/or UE 620 may determine a quantity K of overlapping SSBs, and/or a quantity N of paging MOs for each of the first paging MOs and the second paging MOs. NTN entity 610 may indicate and/or UE 620 may determine a quantity K of sets of paging MOs. For example, quantity K may be two sets, such as for the first paging MOs and for the second paging MOs. If a total quantity of SSBs, or corresponding paging MOs, is S, UE 620 may, based at least in part on what parameter is indicated by NTN entity 610, calculate N as S divided by K, or calculate K as S divided by N. In some aspects, if UE 620 does not receive an indication of a quantity of SSBs for each set of paging MOs, UE 620 may use a default quantity of two paging MOs for each set of paging MOs.

As indicated above, FIG. 6 is provided as an example. Other examples may differ from what is described with regard to FIG. 6.

Figure 7:
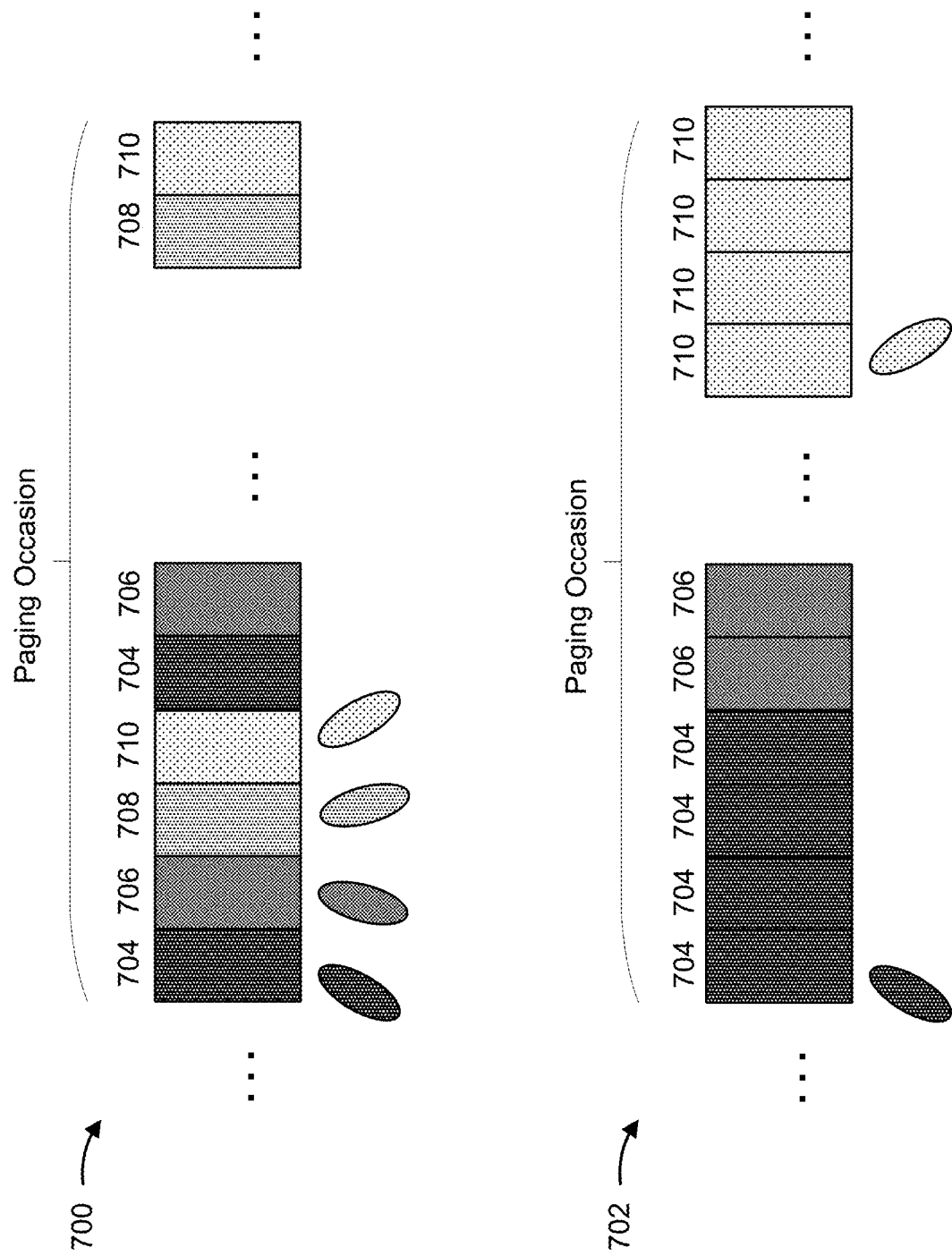
FIG. 7 is a diagram illustrating examples of paging MOs in paging occasions, in accordance with various aspects of the present disclosure.

FIG. 7 is a diagram illustrating examples 700 and 702 of paging MOs in paging occasions, in accordance with various aspects of the present disclosure.

Examples 700 and 702 each show a paging occasion that includes a quantity of paging MOs that correspond to a quantity of SSBs. In some aspects, a paging occasion for a UE may be determined by using a paging frame as a reference or starting frame. A UE may determine a paging frame based at least in part on an identifier for the UE (e.g., UE-ID). A quantity of paging MOs for the paging occasion may be determined based at least in part on a size of a DRX cycle and/or an interval between adjacent paging frames. For example, a paging occasion for a DRX cycle of 320 milliseconds (ms), an inter-paging frame interval of 80 ms, a quantity of 4 paging frames, and an offset of 6 frames may form a paging occasion with 32 paging MOs. The NTN entity may provide a number of paging occasions per paging frame (e.g., 1, 2, 4), and the UE may determine a paging occasion index based at least in part on the UE-ID. Each paging occasion may include a set of S*Y consecutive paging MOs, where S is a quantity of actual transmitted SSBs indicated by a system information block (e.g., SIB 1) and Y is a quantity of paging MOs per SSB in a paging occasion.

Example 700 shows a paging occasion that includes paging MOs for consecutive SSBs. An NTN entity may transmit, for the paging occasion, consecutive SSBs in beams for paging MO 704, paging MO 706, paging MO 708, and paging MO 710. The NTN entity may repeat the beam sweep for the paging occasion and again transmit paging MO 704, paging MO 706, paging MO 708, and paging MO 710. The beam sweep may repeat multiple times depending on a configured length of the paging occasion. Repetition of a beam sweep in the paging occasion may provide more opportunities for a UE at a cell's edge or a UE that is experiencing poor channel conditions to receive an SSB. However, the UE may have to wake up and go to sleep repeatedly in order to receive particular repetitions of the paging MOs. Waking up and sleeping multiple times in a paging occasion may cause the UE to consume more power and processing resources.

In some aspects described herein, an NTN entity may aggregate repetitions for a same beam so that a UE may wake up only once and go back to a deep sleep for the rest of the paging occasion. Example 702 shows a paging occasion where paging MO 704, which may represent a beam for SSB 1, is repeated as consecutive paging MOs. The UE may remain awake for the repetitions of paging MOs 704 and then go back to sleep. The UE may have an increased chance of receiving SSB 1. The UE may also combine SSB 1 from different paging MOs to form a more complete SSB 1. The UE may remain awake or wake for other aggregated repetitions of a paging MO, such as for paging MO 706. The UE may expect paging MOs for either PDCCH or PDSCH to be transmitted consecutively in time from the same SSB beam. The UE may perform repetitions in a paging occasion before performing a beam sweep in another paging occasion.

As indicated above, FIG. 7 is provided as an example. Other examples may differ from what is described with regard to FIG. 7.

Figure 8:
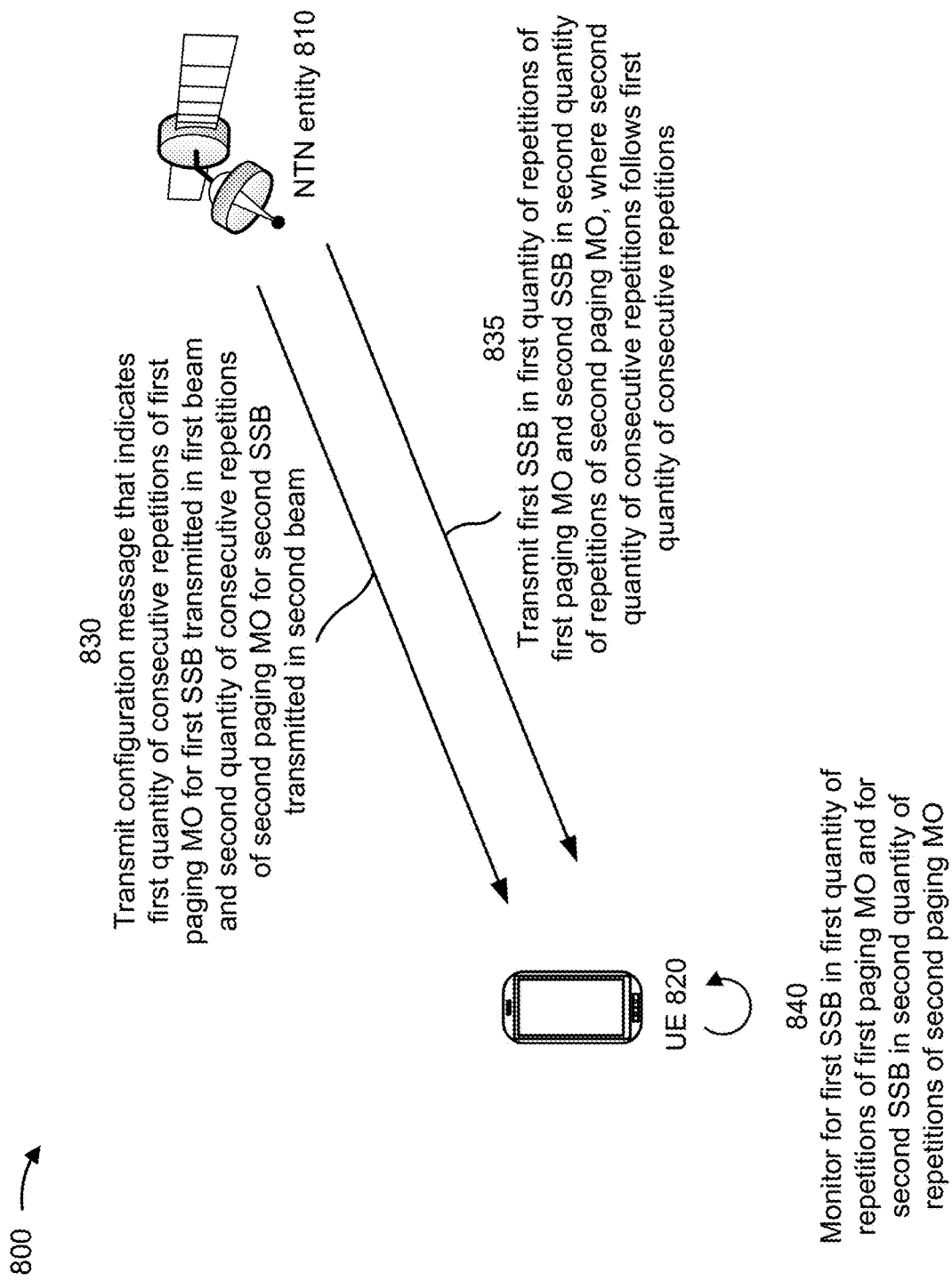
FIG. 8 is a diagram illustrating an example of monitoring for SSBs during paging MOs for non-terrestrial communications, in accordance with various aspects of the present disclosure.

FIG. 8 is a diagram illustrating an example 800 of monitoring for SSBs during paging MOs for non-terrestrial communications, in accordance with various aspects of the present disclosure. As shown, FIG. 8 includes an NTN entity 810 (e.g., base station, relay station) and a UE 820 that may communicate with each other over a satellite link. In some aspects, UE 820 may include a ground station.

As shown by reference number 830, NTN entity 810 may transmit a configuration message that indicates a first quantity of consecutive repetitions of a first paging MO for a first SSB transmitted in a first beam and a second quantity of consecutive repetitions of a second paging MO for a second SSB transmitted in a second beam. For example, NTN entity 810 may indicate four repetitions of SSB 1 and then four repetitions of SSB 2. NTN entity 810 may generate the configuration message allocating consecutive repetitions of each paging MO based at least in part on a quantity of SSBs, a capability of the UE, a power status of the UE, a location of the UE, and/or a reported quantity of SSBs for a set of paging MOs.

As shown by reference number 835, NTN entity 810 may transmit the first SSB in the first quantity of repetitions of the first paging MO and the second SSB in the second quantity of repetitions of the second paging MO. The second quantity of consecutive repetitions may follow the first quantity of consecutive repetitions.

As shown by reference number 840, UE 820 may monitor for the first SSB in the first quantity of repetitions of the first paging MO and for the second SSB in the second quantity of repetitions of the second paging MO. Because the first paging MO is repeated, UE 820 may receive the SSB in a beam transmitted during the first paging MO repetitions. For example, UE 820 may monitor for SSB 1 in the first four repetitions of the first paging MO, receive SSB 1, and then go to sleep. UE 820 may avoid having to wake up again or remain awake for one or more beam sweeps of SSBs to obtain SSB 1. UE 820 may conserve power and processing resources by being asleep longer.

As indicated above, FIG. 8 is provided as an example. Other examples may differ from what is described with regard to FIG. 8.

Figure 9:
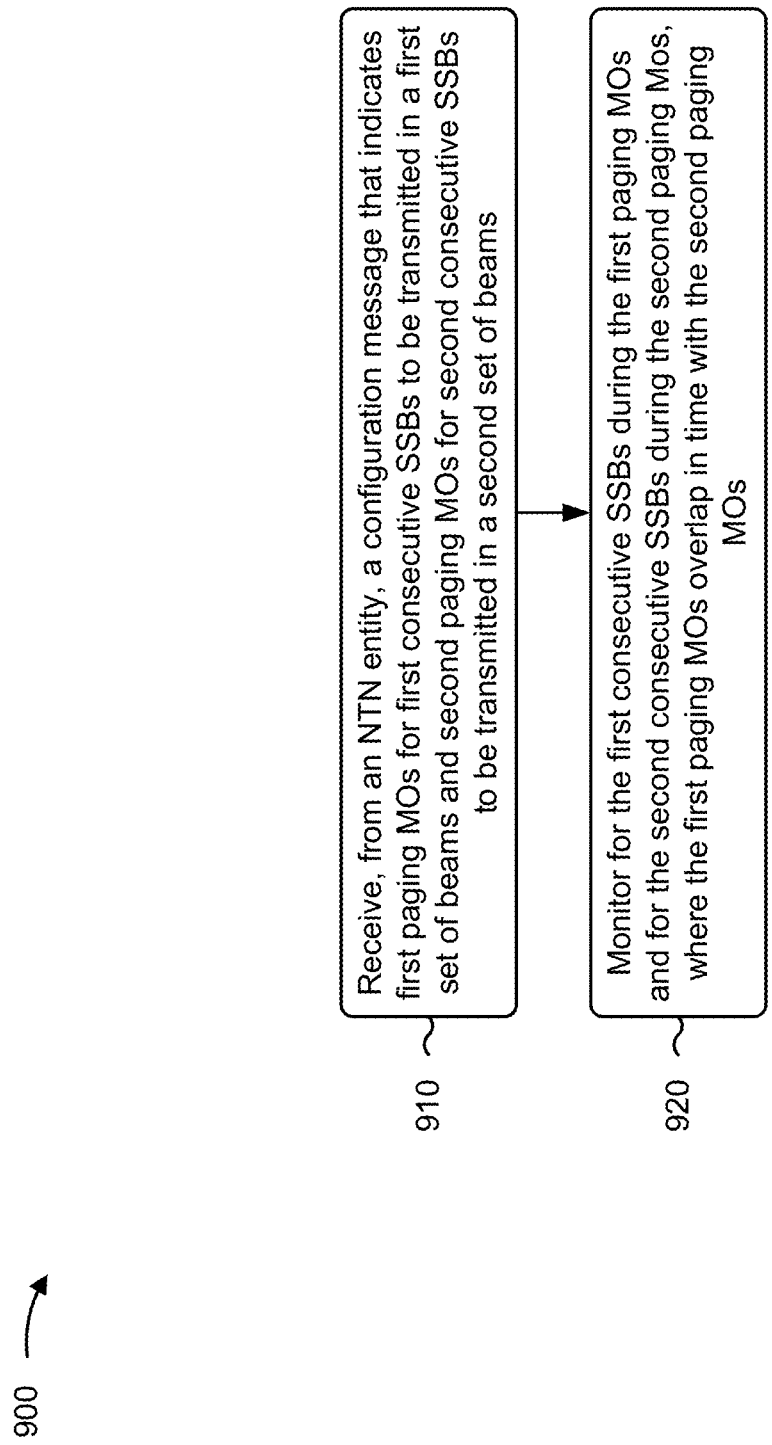
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1-3, UE 620 depicted in FIG. 6) performs operations associated with monitoring for SSBs during paging MOs for non-terrestrial communications.

As shown in FIG. 9, in some aspects, process 900 may include receiving, from an NTN entity, a configuration message that indicates first paging MOs for first consecutive SSBs to be transmitted in a first set of beams and second paging MOs for second consecutive SSBs to be transmitted in a second set of beams (block 910). For example, the UE (e.g., using reception component 1302 depicted in FIG. 13) may receive, from an NTN entity, a configuration message that indicates first paging MOs for first consecutive SSBs to be transmitted in a first set of beams and second paging MOs for second consecutive SSBs to be transmitted in a second set of beams, as described above.

As further shown in FIG. 9, in some aspects, process 900 may include monitoring for the first consecutive SSBs during the first paging MOs and for the second consecutive SSBs during the second paging MOs such that the first paging MOs overlap in time with the second paging MOs (block 920). For example, the UE (e.g., using monitoring component 1308 depicted in FIG. 13) may monitor for the first consecutive SSBs during the first paging MOs and for the second consecutive SSBs during the second paging MOs such that the first paging MOs overlap in time with the second paging MOs, as described above.

Process 900 may include additional aspects, such as any single aspect or any combination of aspects described below and/or in connection with one or more other processes described elsewhere herein.

In a first aspect, the monitoring includes monitoring the first paging MOs and the second paging MOs based at least in part on a determination that an SSB corresponding to a starting paging MO of the first paging MOs is not adjacent to an SSB corresponding to a starting paging MO of the second paging MOs.

In a second aspect, alone or in combination with the first aspect, the monitoring includes monitoring the first paging MOs and the second paging MOs during a same DRX wake period, where a time duration of the DRX wake period is equal to or greater than a length of the first paging MOs and less than a total length of the first paging MOs plus the second paging MOs.

In a third aspect, alone or in combination with one or more of the first and second aspects, the configuration message indicates a paging MO for each of the first consecutive SSBs.

In a fourth aspect, alone or in combination with one or more of the first through third aspects, the configuration message indicates each paging MO with a starting physical downlink control channel MO number.

In a fifth aspect, alone or in combination with one or more of the first through fourth aspects, the configuration message indicates a quantity of the first consecutive SSBs for the first paging MOs, and process 900 includes determining the second consecutive SSBs of the second paging MOs to include consecutive SSBs that follow the first consecutive SSBs.

In a sixth aspect, alone or in combination with one or more of the first through fifth aspects, the configuration message indicates a quantity of the first consecutive SSBs with the first paging MOs that are to overlap with the second paging MOs, and process 900 includes determining the second paging MOs based at least in part on the quantity.

In a seventh aspect, alone or in combination with one or more of the first through sixth aspects, the configuration message indicates a quantity K of sets of paging MOs that are to overlap, monitoring includes determining that the first paging MOs is a set of N consecutive paging MOs and that the second paging MOs is another set of N consecutive paging MOs, and N is equal to a total quantity of paging MOs divided by quantity K.

In an eighth aspect, alone or in combination with one or more of the first through seventh aspects, a default quantity of the first paging MOs is two paging MOs and a default quantity of the second paging MOs is two paging MOs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
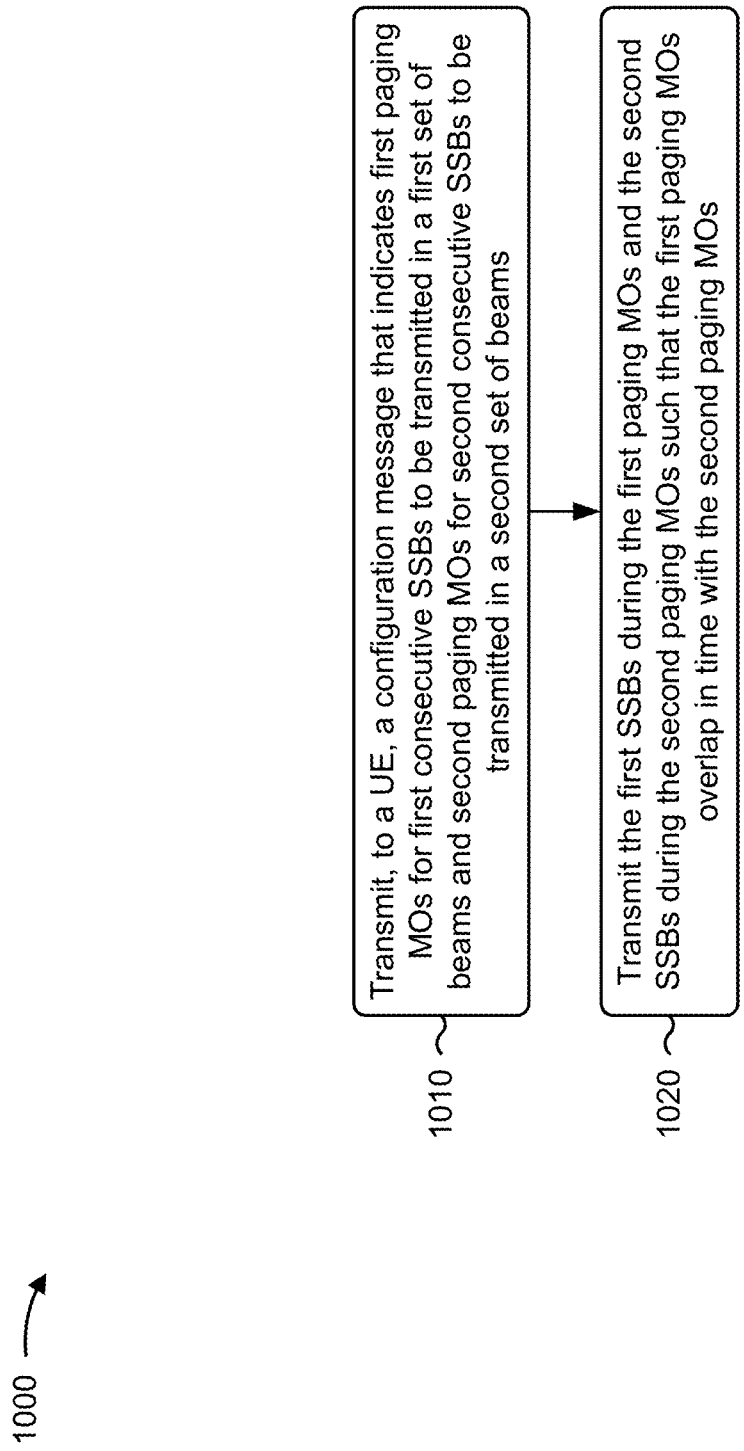
FIG. 10 is a diagram illustrating an example process performed, for example, by an NTN entity, in accordance with various aspects of the present disclosure.

FIG. 10 is a diagram illustrating an example process 1000 performed, for example, by an NTN entity, in accordance with various aspects of the present disclosure. Example process 1000 is an example where the NTN entity (e.g., base station 110 depicted in FIGS. 1-3, NTN entity depicted in FIG. 1, NTN entity 320 or NTN entity 340 depicted in FIG. 3, NTN entity 610 depicted in FIG. 6) performs operations associated with transmitting SSBs during paging MOs for non-terrestrial communications.

As shown in FIG. 10, in some aspects, process 1000 may include transmitting, to a UE, a configuration message that indicates first paging MOs for first consecutive SSBs to be transmitted in a first set of beams and second paging MOs for second consecutive SSBs to be transmitted in a second set of beams (block 1010). For example, the NTN entity (e.g., using transmission component 1404 depicted in FIG. 14) may transmit, to a UE, a configuration message that indicates first paging MOs for first consecutive SSBs to be transmitted in a first set of beams and second paging MOs for second consecutive SSBs to be transmitted in a second set of beams, as described above.

As further shown in FIG. 10, in some aspects, process 1000 may include transmitting the first SSBs during the first paging MOs and the second SSBs during the second paging MOs such that the first paging MOs overlap in time with the second paging MOs (block 1020). For example, the NTN entity (e.g., using transmission component 1404 depicted in FIG. 14) may transmit the first SSBs during the first paging MOs and the second SSBs during the second paging MOs such that the first paging MOs overlap in time with the second paging MOs, as described above.

Process 1000 may include additional aspects, such as any single aspect or any combination of aspects described below and/or in connection with one or more other processes described elsewhere herein.

In a first aspect, the transmitting includes transmitting the first paging MOs and the second paging MOs such that an SSB corresponding to a starting paging MO of the first paging MOs is not adjacent to an SSB corresponding to a starting paging MO of the second paging MOs.

In a second aspect, alone or in combination with the first aspect, transmitting the first SSBs and the second SSBs includes transmitting the first SSBs and the second SSBs during a same DRX wake period, where a time duration of the DRX wake period is equal to or greater than a length of the first paging MOs and less than a total length of the first paging MOs plus the second paging MOs.

In a third aspect, alone or in combination with one or more of the first and second aspects, the configuration message indicates a paging MO for each of the first consecutive SSBs.

In a fourth aspect, alone or in combination with one or more of the first through third aspects, the configuration message indicates each paging MO with a starting physical downlink control channel MO number.

In a fifth aspect, alone or in combination with one or more of the first through fourth aspects, the configuration message indicates a quantity of the first consecutive SSBs for the first paging MOs.

In a sixth aspect, alone or in combination with one or more of the first through fifth aspects, the configuration message indicates a quantity of sets of paging MOs that are to overlap.

In a seventh aspect, alone or in combination with one or more of the first through sixth aspects, the configuration message indicates a quantity of the first consecutive SSBs with the first paging MOs that are to overlap with the second paging MOs.

In an eighth aspect, alone or in combination with one or more of the first through seventh aspects, a default quantity of the first paging MOs is two paging MOs and a default quantity of the second paging MOs is two paging MOs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
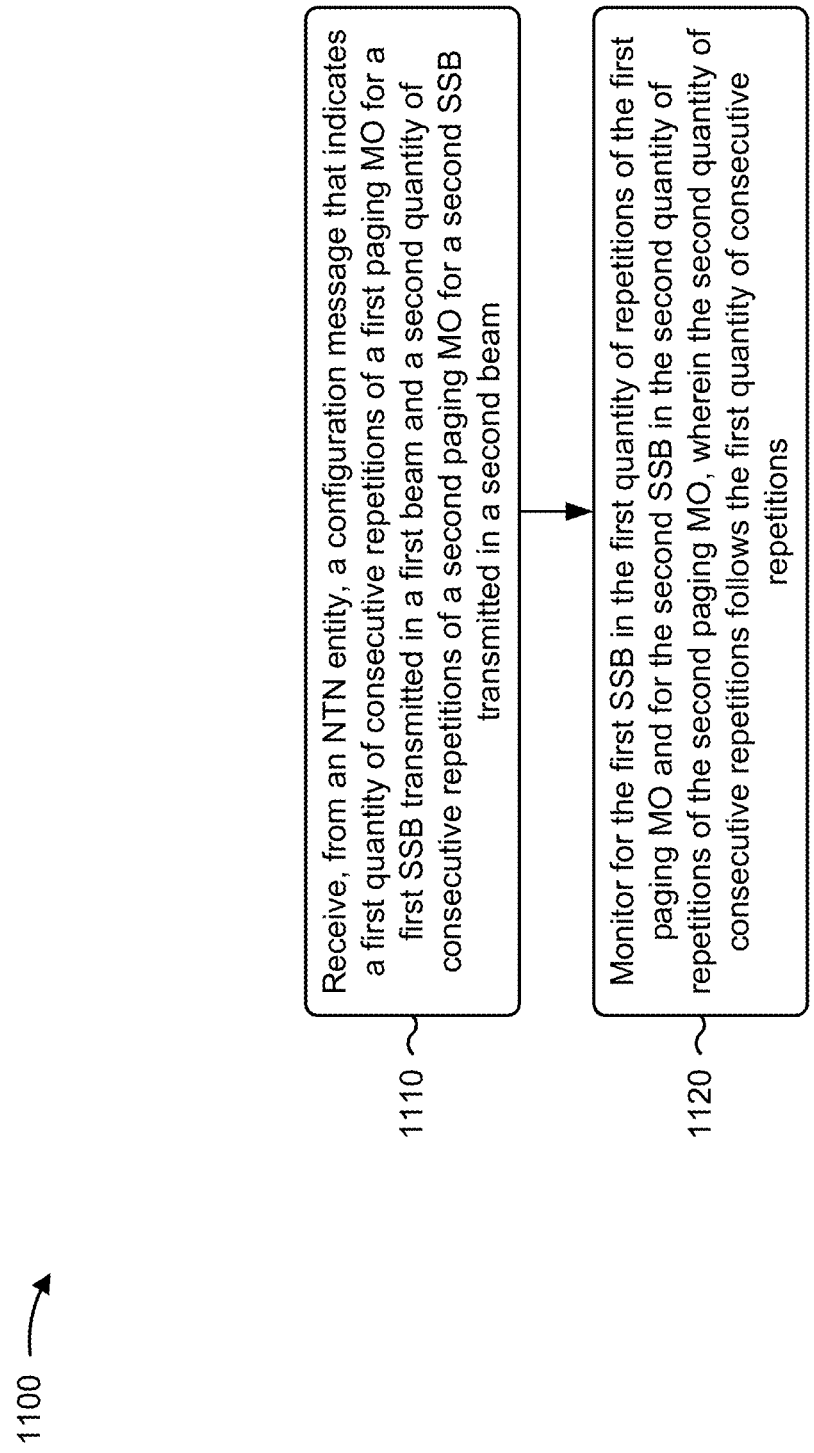
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 depicted in FIG. 1-3, UE 820 depicted in FIG. 8) performs operations associated with monitoring for SSBs during paging MOs for non-terrestrial communications.

As shown in FIG. 11, in some aspects, process 1100 may include receiving, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam (block 1110). For example, the UE (e.g., using reception component 1502 depicted in FIG. 15) may receive, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam, as described above.

As further shown in FIG. 11, in some aspects, process 1100 may include monitoring for the first SSB in the first quantity of repetitions of the first paging MO and for the second SSB in the second quantity of repetitions of the second paging MO (block 1120). For example, the UE (e.g., using monitoring component 1508 depicted in FIG. 15) may monitor for the first SSB in the first quantity of repetitions of the first paging MO and for the second SSB in the second quantity of repetitions of the second paging MO, as described above. In some aspects, the second quantity of consecutive repetitions follows the first quantity of consecutive repetitions.

Process 1100 may include additional aspects, such as any single aspect or any combination of aspects described below and/or in connection with one or more other processes described elsewhere herein.

In an aspect, receiving the configuration message includes receiving an indication of the first quantity in system information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
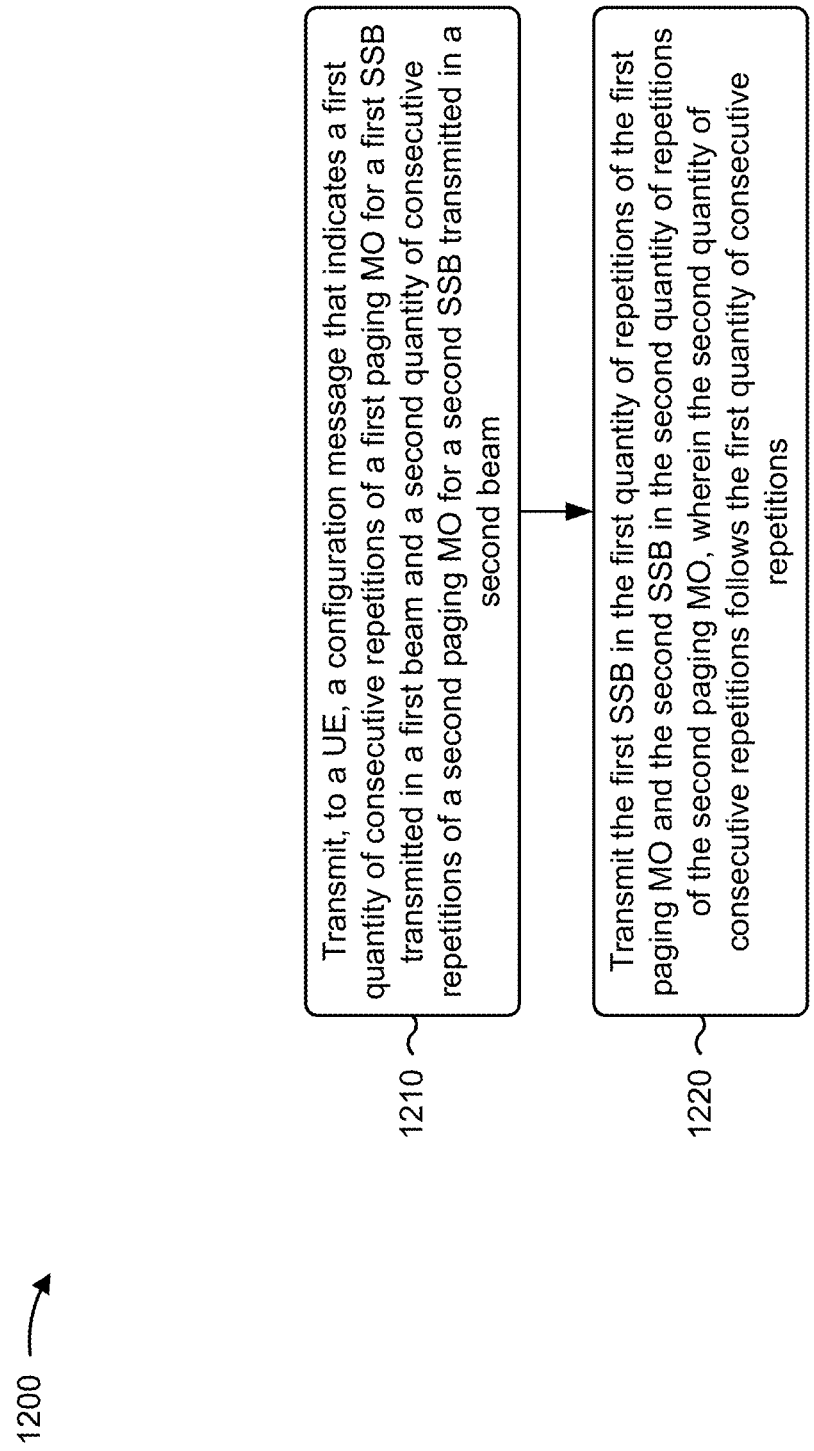
FIG. 12 is a diagram illustrating an example process performed, for example, by an NTN entity, in accordance with various aspects of the present disclosure.

FIG. 12 is a diagram illustrating an example process 1200 performed, for example, by an NTN entity, in accordance with various aspects of the present disclosure. Example process 1200 is an example where the NTN entity (e.g., base station 110 depicted in FIGS. 1-3, NTN entity depicted in FIG. 1, NTN entity 320 or NTN entity 340 depicted in FIG. 3, NTN entity 810 depicted in FIG. 8) performs operations associated with transmitting SSBs during paging MOs for non-terrestrial communications.

As shown in FIG. 12, in some aspects, process 1200 may include transmitting, to a UE, a configuration message that indicates a first quantity of consecutive repetitions of a first paging MO for a first SSB transmitted in a first beam and a second quantity of consecutive repetitions of a second paging MO for a second SSB transmitted in a second beam (block 1210). For example, the NTN entity (e.g., using transmission component 1604 depicted in FIG. 16) may transmit, to a UE, a configuration message that indicates a first quantity of consecutive repetitions of a first paging MO for a first SSB transmitted in a first beam and a second quantity of consecutive repetitions of a second paging MO for a second SSB transmitted in a second beam, as described above.

As further shown in FIG. 12, in some aspects, process 1200 may include transmitting the first SSB in the first quantity of repetitions of the first paging MO and the second SSB in the second quantity of repetitions of the second paging MO (block 1220). For example, the NTN entity (e.g., using transmission component 1604 depicted in FIG. 16) may transmit the first SSB in the first quantity of repetitions of the first paging MO and the second SSB in the second quantity of repetitions of the second paging MO, as described above. In some aspects, the second quantity of consecutive repetitions follows the first quantity of consecutive repetitions.

Process 1200 may include additional aspects, such as any single aspect or any combination of aspects described below and/or in connection with one or more other processes described elsewhere herein.

In an aspect, transmitting the configuration message includes transmitting an indication of the first quantity in system information.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
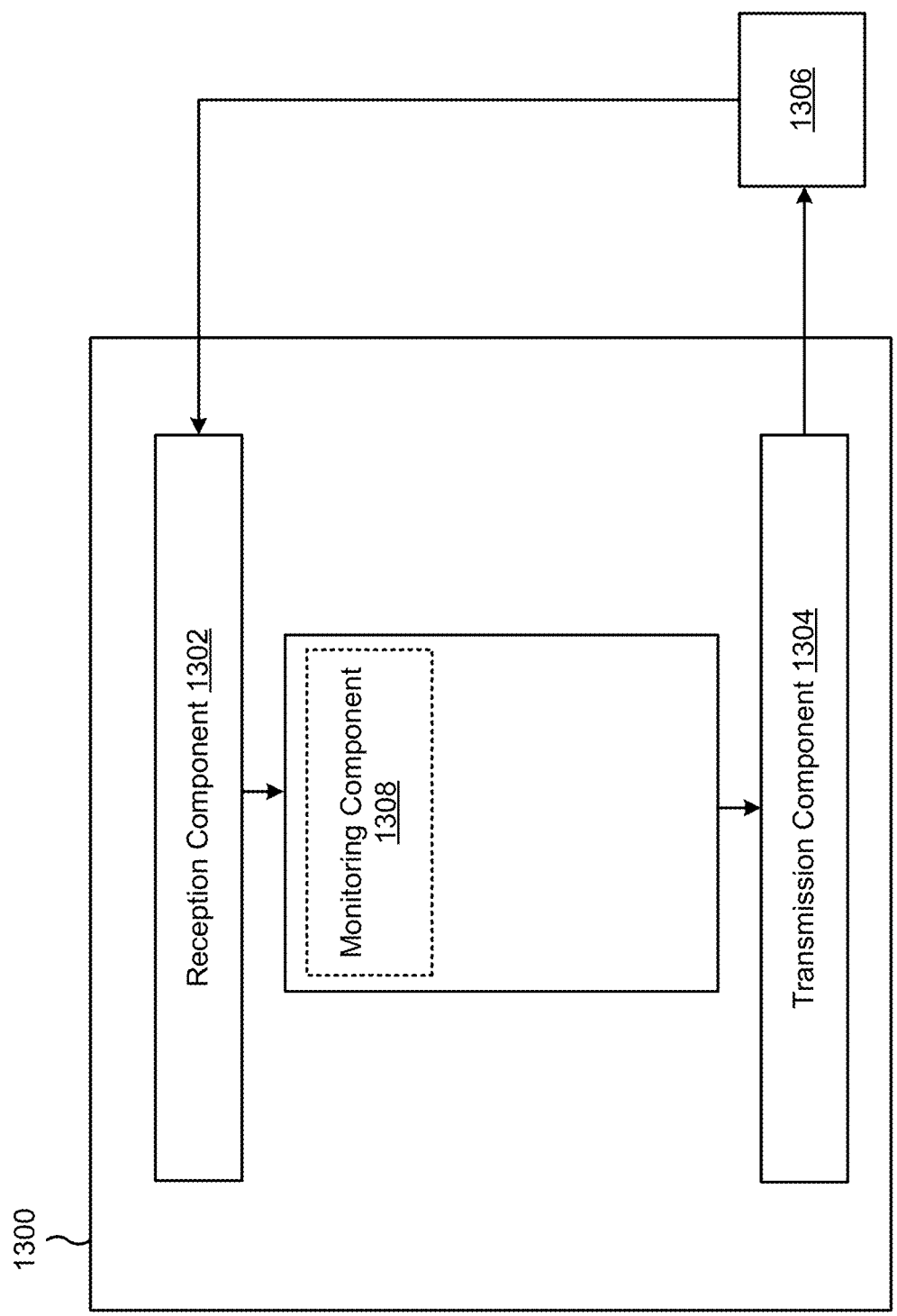
FIGS. 13-16 are block diagrams of example apparatuses for wireless communication, in accordance with various aspects of the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a monitoring component 1308, among other examples.

In some aspects, the apparatus 1300 may be configured to perform one or more operations described herein in connection with FIGS. 1-8. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive, from an NTN entity, a configuration message that indicates first paging MOs for first consecutive SSBs to be transmitted in a first set of beams and second paging MOs for second consecutive SSBs to be transmitted in a second set of beams. The monitoring component 1308 may monitor for the first consecutive SSBs during the first paging MOs and for the second consecutive SSBs during the second paging MOs such that the first paging MOs overlap in time with the second paging MOs.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
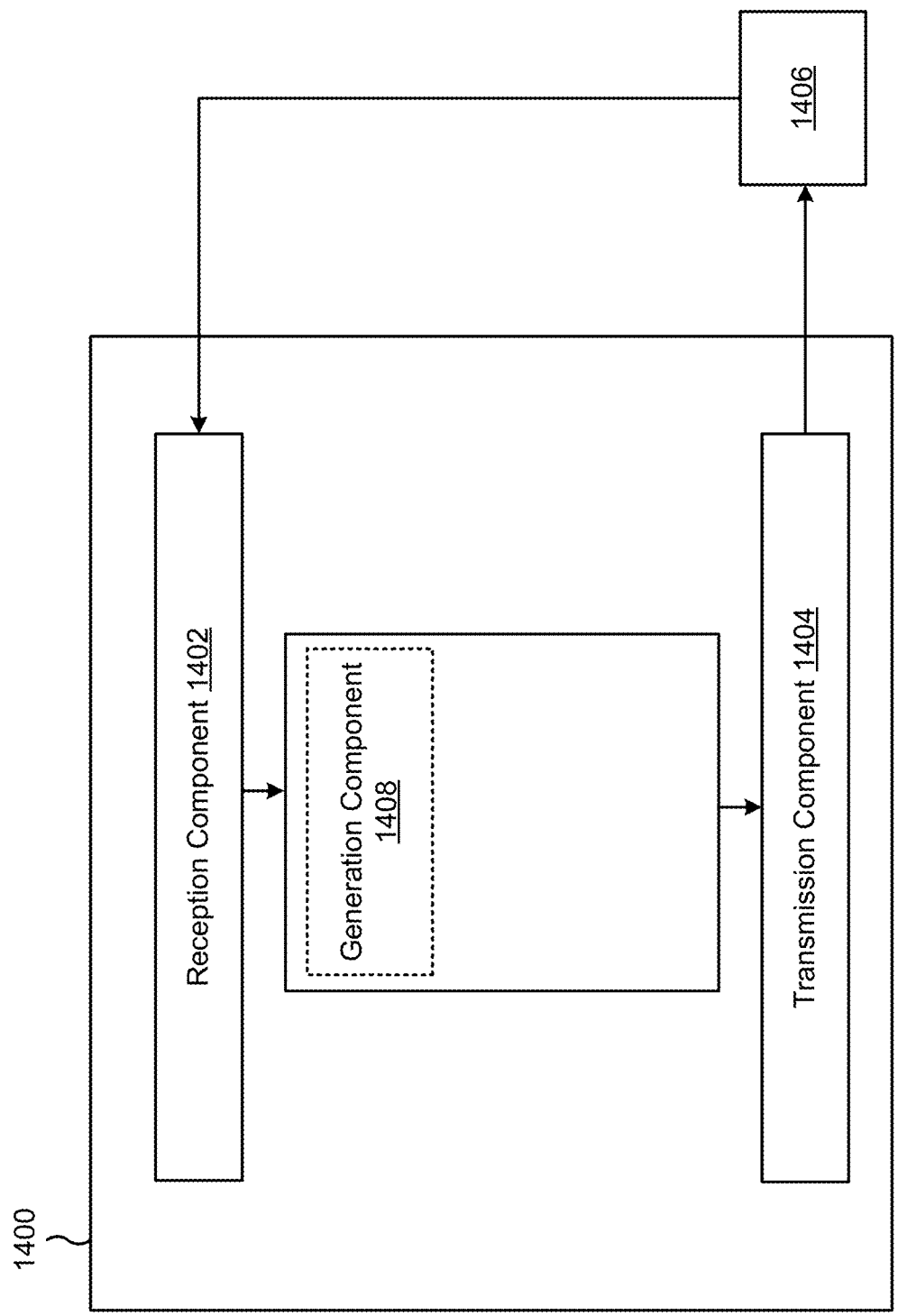

FIG. 14 is a block diagram of an example apparatus 1400 for wireless communication. The apparatus 1400 may be an NTN entity, or an NTN entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a generation component 1408, among other examples.

In some aspects, the apparatus 1400 may be configured to perform one or more operations described herein in connection with FIGS. 1-8. Additionally, or alternatively, the apparatus 1400 may be configured to perform one or more processes described herein, such as process 10 of FIG. 10. In some aspects, the apparatus 1400 and/or one or more components shown in FIG. 14 may include one or more components of the NTN entity described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the NTN entity described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the NTN entity described above in connection with FIG. 2. In some aspects, the transmission component 1404 may be co-located with the reception component 1402 in a transceiver.

The generation component 1408 may generate a configuration message that indicates first paging MOs for first consecutive SSBs to be transmitted in a first set of beams and second paging MOs for second consecutive SSBs to be transmitted in a second set of beams. The transmission component 1404 may transmit, to a UE, the configuration message. The transmission component 1404 may transmit the first SSBs during the first paging MOs and the second SSBs during the second paging MOs such that the first paging MOs overlap in time with the second paging MOs.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
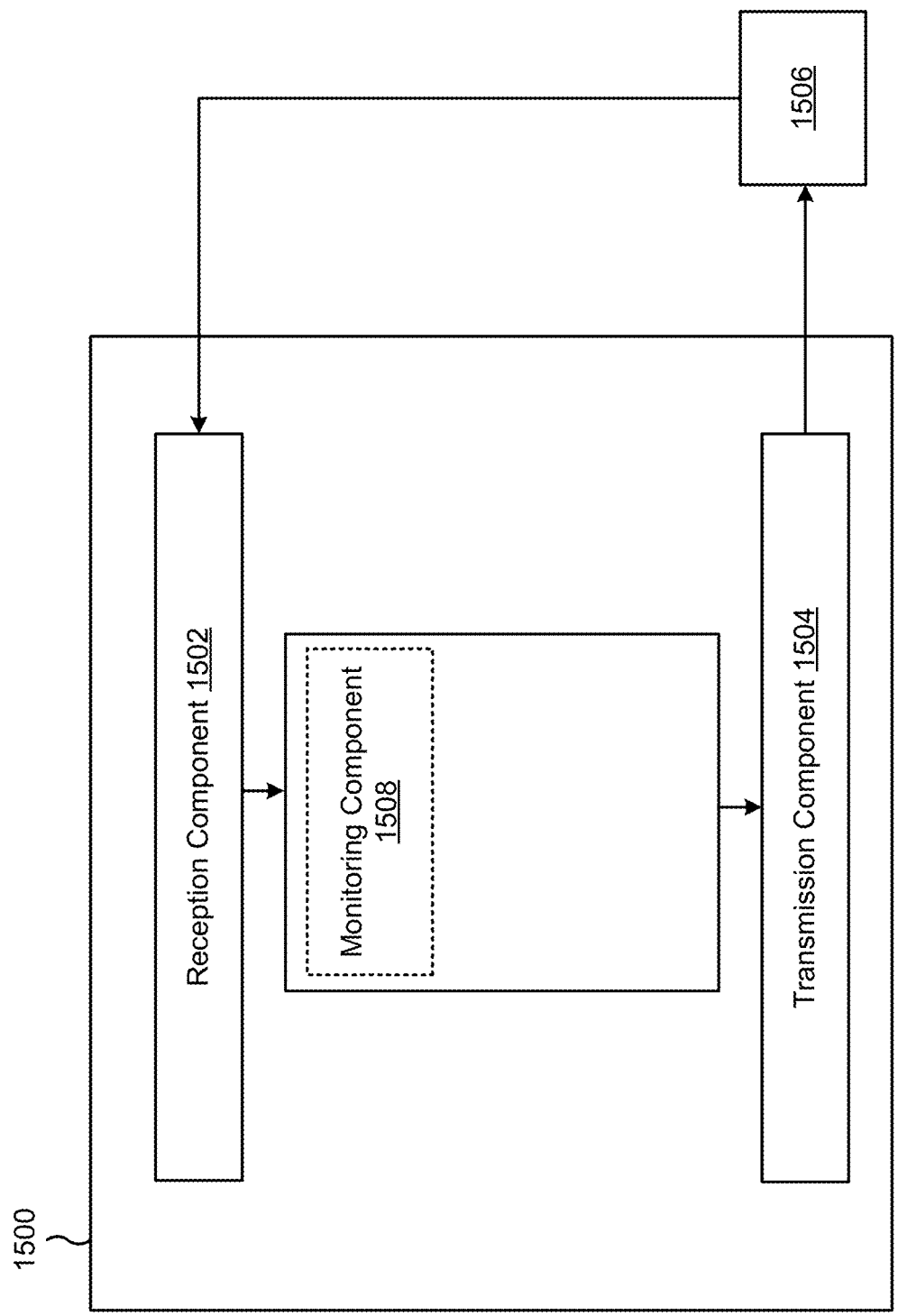

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a monitoring component 1508, among other examples.

In some aspects, the apparatus 1500 may be configured to perform one or more operations described herein in connection with FIGS. 1-8. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The reception component 1502 may receive, from an NTN entity, a configuration message that indicates a first quantity of consecutive repetitions of a first paging MO for a first SSB transmitted in a first beam and a second quantity of consecutive repetitions of a second paging MO for a second SSB transmitted in a second beam. The monitoring component 1508 may monitor for the first SSB in the first quantity of repetitions of the first paging MO and for the second SSB in the second quantity of repetitions of the second paging MO, where the second quantity of consecutive repetitions follows the first quantity of consecutive repetitions.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
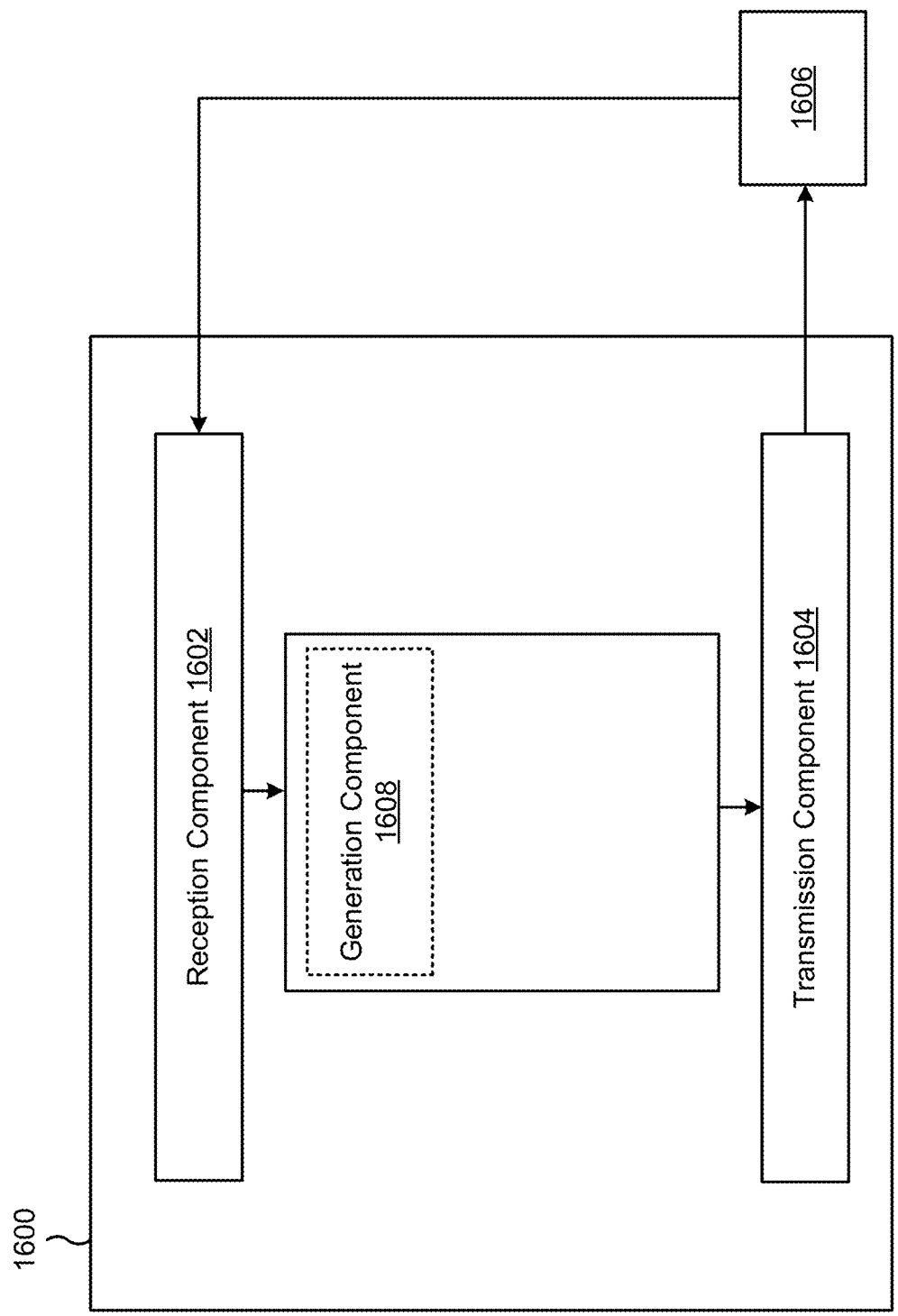

FIG. 16 is a block diagram of an example apparatus 1600 for wireless communication. The apparatus 1600 may be an NTN entity, or an NTN entity may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a generation component 1608, among other examples.

In some aspects, the apparatus 1600 may be configured to perform one or more operations described herein in connection with FIGS. 1-8. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the NTN entity described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the NTN entity described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the NTN entity described above in connection with FIG. 2. In some aspects, the transmission component 1604 may be co-located with the reception component 1602 in a transceiver.

The generation component 1608 may generate a configuration message that indicates a first quantity of consecutive repetitions of a first paging MO for a first SSB transmitted in a first beam and a second quantity of consecutive repetitions of a second paging MO for a second SSB transmitted in a second beam. The transmission component 1604 may transmit, to a UE, the configuration message. The transmission component 1604 may transmit the first SSB in the first quantity of repetitions of the first paging MO and the second SSB in the second quantity of repetitions of the second paging MO, where the second quantity of consecutive repetitions follows the first quantity of consecutive repetitions.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The foregoing disclosure provides illustration and description but is not intended to be exhaustive or to limit the aspects to the precise forms disclosed. Modifications and variations may be made in light of the above disclosure or may be acquired from practice of the aspects.

The following provides an overview of aspects of the present disclosure:

Aspect 1: A method of wireless communication performed by a user equipment (UE), A method of wireless communication performed by a user equipment (UE), comprising: receiving, from a non-terrestrial network (NTN) entity, a configuration message that indicates first paging monitoring occasions (MOs) for first consecutive synchronization signal blocks (SSBs) to be transmitted in a first set of beams and second paging MOs for second consecutive SSBs to be transmitted in a second set of beams; and monitoring for the first consecutive SSBs during the first paging MOs and for the second consecutive SSBs during the second paging MOs such that the first paging MOs overlap in time with the second paging MOs.

Aspect 2: The method of aspect 1, wherein the monitoring includes monitoring the first paging MOs and the second paging MOs based at least in part on a determination that an SSB corresponding to a starting paging MO of the first paging MOs is not adjacent to an SSB corresponding to a starting paging MO of the second paging MOs.

Aspect 3: The method of aspect 1 or 2, wherein the monitoring includes monitoring the first paging MOs and the second paging MOs during a same discontinuous reception (DRX) wake period, wherein a time duration of the DRX wake period is equal to or greater than a length of the first paging MOs and less than a total length of the first paging MOs plus the second paging MOs.

Aspect 4: The method of any of aspects 1-3, wherein the configuration message indicates a paging MO for each of the first consecutive SSBs.

Aspect 5: The method of aspect 4, wherein the configuration message indicates each paging MO with a starting physical downlink control channel MO number.

Aspect 6: The method of any of aspects 1-5, wherein the configuration message indicates a quantity of the first consecutive SSBs for the first paging MOs, and wherein the method includes determining the second consecutive SSBs of the second paging MOs to include consecutive SSBs that follow the first consecutive SSBs.

Aspect 7: The method of any of aspects 1-6, wherein the configuration message indicates a quantity of the first consecutive SSBs with the first paging MOs that are to overlap with the second paging MOs, and wherein the method includes determining the second paging MOs based at least in part on the quantity.

Aspect 8: The method of any of aspects 1-7, wherein the configuration message indicates a quantity K of sets of paging MOs that are to overlap, wherein the monitoring includes determining that the first paging MOs is a set of N consecutive paging MOs and that the second paging MOs is another set of N consecutive paging MOs, and wherein N is equal to a total quantity of paging MOs divided by quantity K.

Aspect 9: The method of any of aspects 1-8, wherein a default quantity of the first paging MOs is two paging MOs and a default quantity of the second paging MOs is two paging MOs.

Aspect 10: A method of wireless communication performed by a non-terrestrial network (NTN) entity, comprising: transmitting, to a user equipment (UE), a configuration message that indicates first paging monitoring occasions (MOs) for first consecutive synchronization signal blocks (SSBs) to be transmitted in a first set of beams and second paging MOs for second consecutive SSBs to be transmitted in a second set of beams; and transmitting the first SSBs during the first paging MOs and the second SSBs during the second paging MOs such that the first paging MOs overlap in time with the second paging MOs.

Aspect 11: The method of aspect 10, wherein the transmitting includes transmitting the first paging MOs and the second paging MOs such that an SSB corresponding to a starting paging MO of the first paging MOs is not adjacent to an SSB corresponding to a starting paging MO of the second paging MOs.

Aspect 12: The method of aspect 10 or 11, wherein transmitting the first SSBs and the second SSBs includes transmitting the first SSBs and the second SSBs during a same discontinuous reception (DRX) wake period, wherein a time duration of the DRX wake period is equal to or greater than a length of the first paging MOs and less than a total length of the first paging MOs plus the second paging MOs.

Aspect 13: The method of any of aspects 10-12, wherein the configuration message indicates a paging MO for each of the first consecutive SSBs.

Aspect 14: The method of aspect 13, wherein the configuration message indicates each paging MO with a starting physical downlink control channel MO number.

Aspect 15: The method of any of aspects 10-14, wherein the configuration message indicates a quantity of the first consecutive SSBs for the first paging MOs.

Aspect 16: The method of any of aspects 10-15, wherein the configuration message indicates a quantity of sets of paging MOs that are to overlap.

Aspect 17: The method of any of aspects 10-16, wherein the configuration message indicates a quantity of the first consecutive SSBs with the first paging MOs that are to overlap with the second paging MOs.

Aspect 18: The method of any of aspects 10-17, wherein a default quantity of the first paging MOs is two paging MOs and a default quantity of the second paging MOs is two paging MOs.

Aspect 19: A method of wireless communication performed by a user equipment (UE), comprising: receiving, from a non-terrestrial network (NTN) entity, a configuration message that indicates a first quantity of consecutive repetitions of a first paging monitoring occasion (MO) for a first synchronization signal block (SSB) transmitted in a first beam and a second quantity of consecutive repetitions of a second paging MO for a second SSB transmitted in a second beam; and monitoring for the first SSB in the first quantity of repetitions of the first paging MO and for the second SSB in the second quantity of repetitions of the second paging MO, wherein the second quantity of consecutive repetitions follows the first quantity of consecutive repetitions.

Aspect 20: The method of aspect 19, wherein receiving the configuration message includes receiving an indication of the first quantity in system information.

Aspect 21: A method of wireless communication performed by a non-terrestrial network (NTN) entity, comprising: transmitting, to a user equipment (UE), a configuration message that indicates a first quantity of consecutive repetitions of a first paging monitoring occasion (MO) for a first synchronization signal block (SSB) transmitted in a first beam and a second quantity of consecutive repetitions of a second paging MO for a second SSB transmitted in a second beam; and transmitting the first SSB in the first quantity of repetitions of the first paging MO and the second SSB in the second quantity of repetitions of the second paging MO, wherein the second quantity of consecutive repetitions follows the first quantity of consecutive repetitions.

Aspect 22: The method of aspect 21, wherein transmitting the configuration message includes transmitting an indication of the first quantity in system information.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 24: A device for wireless communication, comprising a memory and one or more processors coupled to the memory, the memory and the one or more processors configured to perform the method of one or more aspects of aspects 1-22.

Aspect 25: An apparatus for wireless communication, comprising at least one means for performing the method of one or more aspects of aspects 1-22.

Aspect 26: A non-transitory computer-readable medium storing code for wireless communication, the code comprising instructions executable by a processor to perform the method of one or more aspects of aspects 1-22.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-22.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), A method of wireless communication performed by a user equipment (UE), comprising:
    receiving, from a non-terrestrial network (NTN) entity, a configuration message that indicates first paging monitoring occasions (MOs) for first consecutive synchronization signal blocks (SSBs) to be transmitted in a first set of beams and second paging MOs for second consecutive SSBs to be transmitted in a second set of beams; and
    monitoring for the first consecutive SSBs during the first paging MOs and for the second consecutive SSBs during the second paging MOs, wherein the first paging MOs overlap in time with the second paging MOs.

2. The method of claim 1, wherein the monitoring includes monitoring the first paging MOs and the second paging MOs based at least in part on a determination that an SSB corresponding to a starting paging MO of the first paging MOs is not adjacent to an SSB corresponding to a starting paging MO of the second paging MOs.

3. The method of claim 1, wherein the monitoring includes monitoring the first paging MOs and the second paging MOs during a same discontinuous reception (DRX) wake period, wherein a time duration of the DRX wake period is equal to or greater than a length of the first paging MOs and less than a total length of the first paging MOs plus the second paging MOs.

4. The method of claim 1, wherein the configuration message indicates a paging MO for each of the first consecutive SSBs.

5. The method of claim 4, wherein the configuration message indicates each paging MO with a starting physical downlink control channel MO number.

6. The method of claim 1, wherein the configuration message indicates a quantity of the first consecutive SSBs for the first paging MOs, and wherein the method includes determining the second consecutive SSBs of the second paging MOs to include consecutive SSBs that follow the first consecutive SSBs.

7. The method of claim 1, wherein the configuration message indicates a quantity of the first consecutive SSBs with the first paging MOs that are to overlap with the second paging MOs, and wherein the method includes determining the second paging MOs based at least in part on the quantity.

8. The method of claim 1, wherein the configuration message indicates a quantity K of sets of paging MOs that are to overlap, wherein the monitoring includes determining that the first paging MOs is a set of N consecutive paging MOs and that the second paging MOs is another set of N consecutive paging MOs, and wherein N is equal to a total quantity of paging MOs divided by quantity K.

9. The method of claim 1, wherein a default quantity of the first paging MOs is two paging MOs and a default quantity of the second paging MOs is two paging MOs.

10. A method of wireless communication performed by a non-terrestrial network (NTN) entity, comprising:
transmitting, to a user equipment (UE), a configuration message that indicates first paging monitoring occasions (MOs) for first consecutive synchronization signal blocks (SSBs) to be transmitted in a first set of beams and second paging MOs for second consecutive SSBs to be transmitted in a second set of beams; and
transmitting the first SSBs during the first paging MOs and the second SSBs during the second paging MOs such that the first paging MOs overlap in time with the second paging MOs.

11. The method of claim 10, wherein the transmitting includes transmitting the first paging MOs and the second paging MOs such that an SSB corresponding to a starting paging MO of the first paging MOs is not adjacent to an SSB corresponding to a starting paging MO of the second paging MOs.

12. The method of claim 10, wherein transmitting the first SSBs and the second SSBs includes transmitting the first SSBs and the second SSBs during a same discontinuous reception (DRX) wake period, wherein a time duration of the DRX wake period is equal to or greater than a length of the first paging MOs and less than a total length of the first paging MOs plus the second paging MOs.

13. The method of claim 10, wherein the configuration message indicates a paging MO for each of the first consecutive SSBs.

14. The method of claim 13, wherein the configuration message indicates each paging MO with a starting physical downlink control channel MO number.

15. The method of claim 10, wherein the configuration message indicates a quantity of the first consecutive SSBs for the first paging MOs.

16. The method of claim 10, wherein the configuration message indicates a quantity of sets of paging MOs that are to overlap.

17. The method of claim 10, wherein the configuration message indicates a quantity of the first consecutive SSBs with the first paging MOs that are to overlap with the second paging MOs.

18. The method of claim 10, wherein a default quantity of the first paging MOs is two paging MOs and a default quantity of the second paging MOs is two paging MOs.

19. A method of wireless communication performed by a user equipment (UE), comprising:
receiving, from a non-terrestrial network (NTN) entity, a configuration message that indicates a first quantity of consecutive repetitions of a first paging monitoring occasion (MO) for a first synchronization signal block (SSB) transmitted in a first beam and a second quantity of consecutive repetitions of a second paging MO for a second SSB transmitted in a second beam; and
monitoring for the first SSB in the first quantity of consecutive repetitions of the first paging MO and for the second SSB in the second quantity of consecutive repetitions of the second paging MO, wherein the second quantity of consecutive repetitions follows the first quantity of consecutive repetitions.

20. The method of claim 19, wherein receiving the configuration message includes receiving an indication of the first quantity in system information.

21. A method of wireless communication performed by a non-terrestrial network (NTN) entity, comprising:
transmitting, to a user equipment (UE), a configuration message that indicates a first quantity of consecutive repetitions of a first paging monitoring occasion (MO) for a first synchronization signal block (SSB) transmitted in a first beam and a second quantity of consecutive repetitions of a second paging MO for a second SSB transmitted in a second beam; and
transmitting the first SSB in the first quantity of consecutive repetitions of the first paging MO and the second SSB in the second quantity of consecutive repetitions of the second paging MO, wherein the second quantity of consecutive repetitions follows the first quantity of consecutive repetitions.

22. The method of claim 21, wherein transmitting the configuration message includes transmitting an indication of the first quantity in system information.

* * * * *